US012343950B1

(12) United States Patent
Chou et al.

(10) Patent No.: US 12,343,950 B1
(45) Date of Patent: Jul. 1, 2025

(54) TIRE REPAIRING DEVICE AND GLUE APPLICATOR

(71) Applicant: UNIK WORLD INDUSTRIAL CO., LTD., Tainan (TW)

(72) Inventors: Wen San Chou, Tainan (TW); Cheng Hsien Chou, Tainan (TW)

(73) Assignee: UNIK WORLD INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 18/424,858

(22) Filed: Jan. 28, 2024

(30) Foreign Application Priority Data

Dec. 14, 2023 (TW) .................................. 112148838

(51) Int. Cl.
 *B29C 73/16* (2006.01)
(52) U.S. Cl.
 CPC .................................. *B29C 73/166* (2013.01)
(58) Field of Classification Search
 CPC ............................ B29C 73/166; B29C 73/025
 USPC .......................................................... 141/38
 See application file for complete search history.

(56) References Cited

U.S. PATENT DOCUMENTS

| 2004/0173282 | A1  | 9/2004 | Laetgaard |            |
|--------------|-----|--------|-----------|------------|
| 2014/0261878 | A1* | 9/2014 | Jhou      | B29C 73/166 |
|              |     |        |           | 141/38     |
| 2015/0059921 | A1* | 3/2015 | Jhou      | B29C 73/166 |
|              |     |        |           | 141/38     |
| 2021/0016616 | A1* | 1/2021 | Chou      | B29C 73/166 |

FOREIGN PATENT DOCUMENTS

| CN | 1956838      | 5/2007  |
| CN | 110267802    | 9/2019  |
| DE | 202013012226 | 9/2015  |
| DE | 202020104030 | 9/2020  |
| EP | 2792473      | 10/2014 |
| EP | 2815875      | 12/2014 |
| EP | 2955071      | 12/2015 |
| EP | 3566860      | 11/2019 |
| JP | 2013159002   | 8/2013  |
| JP | 2016510269   | 4/2016  |
| JP | 2016511184   | 4/2016  |
| JP | 3227687      | 9/2020  |
| TW | M509133      | 9/2015  |
| TW | 202103986    | 2/2021  |
| TW | M652440      | 3/2024  |

* cited by examiner

*Primary Examiner* — Timothy P. Kelly
(74) *Attorney, Agent, or Firm* — JCIPRNET

(57) ABSTRACT

A tire repairing device includes a box, an air supply source, and a glue applicator for inflating or applying glue to a tire. The glue applicator includes a tank having a receiving room for holding the glue, a cover having a circular pipe, an outlet pipe, and an air entrance pipe, and a middle pipe having a pair of sealing sections and a neck section therebetween. The outlet pipe and the air entrance pipe extend from the circular pipe respectively and communicate therewith. The air supply source is connected to the air entrance pipe and provides air thereto. The middle pipe is movably disposed in the circular pipe to be coaxially stacked therewith. An outer diameter of the neck section is less than the sealing section. The sealing section abuts against an inner wall of the circular pipe, and there is a gap therebetween for the air to pass.

15 Claims, 21 Drawing Sheets

TIRE REPAIRING DEVICE AND GLUE
APPLICATOR

CROSS-REFERENCE TO RELATED APPLICATION

This application claims the priority benefit of Taiwan application serial no. 112148838, filed on Dec. 14, 2023. The entirety of the above-mentioned patent application is hereby incorporated by reference herein and made a part of this specification.

BACKGROUND

Technical Field

The disclosure relates to a tire repairing device and a glue applicator.

Description of Related Art

As equipment currently provided for repairing damaged tires, some use a glue applicator with air supply. When necessary, the user connects the air inlet manifold of the glue applicator to the air outlet connector of the air source. The outlet pipe of the glue applicator is then connected to the air nozzle of the damaged tire. By supplying air to the glue applicator through the air source, the air pressure may be used to force the glue in the glue applicator out and into the damaged tire to achieve the purpose of repairing the tire.

It may be seen from the above that although the tire repair process requires glue applying and inflating, the existing operation methods are still performed in separate ways, which cannot improve the operation efficiency.

SUMMARY

The disclosure provides a glue applicator and a tire repairing device so that inflating or applying glue can be performed to a tire.

A tire repairing device according to the disclosure is for inflating or applying glue to a tire. The tire repairing device includes a box, an air supply source, and a glue applicator. The glue applicator includes a tank, a cover, and a middle pipe. The tank has a receiving room for holding the glue. The cover is assembled to the tank. The cover has a circular pipe, an outlet pipe, and an air entrance pipe. The outlet pipe and the air entrance pipe extend from the circular pipe respectively and communicate with the circular pipe. The air supply source is connected to the air entrance pipe and provides air thereto. The middle pipe is movably disposed in the circular pipe so that the circular pipe and the middle pipe are coaxially stacked together with each other. The middle pipe has a pair of sealing sections and a neck section between the sealing sections. The outer diameter of the neck section of the middle pipe is less than the outer diameter of the sealing section of the middle pipe. Each sealing section abuts against the inner wall of the circular pipe, and there is a gap between the neck section and the inner wall of the circular pipe for the air to pass. During the inflating process, the neck section communicates between the air entrance pipe and the outlet pipe, so that the air passes through the air entrance pipe, the neck section, and the outlet pipe sequentially to enter the tire. During the glue applying process, the neck section communicates between the air entrance pipe and the receiving room of the tank, and the inner hollow portion of the middle pipe communicates between the receiving room of the tank and the outlet pipe. The air enters the receiving room through the air entrance pipe and the neck section sequentially, and the air forces the glue into the inner hollow portion of the middle pipe to enter the tire through the outlet pipe.

A glue applicator according to the disclosure includes a tank, a cover, and a middle pipe. The tank has a receiving room for holding the glue. The cover is assembled to the tank. The cover has a circular pipe, an outlet pipe, and an air entrance pipe. The outlet pipe and the air entrance pipe extend from the circular pipe respectively and communicate with the circular pipe. The middle pipe is movably disposed in the circular pipe so that the circular pipe and the middle pipe are coaxially stacked together with each other. The middle pipe has a pair of sealing sections and a neck section between the sealing sections. The outer diameter of the neck section of the middle pipe is less than the outer diameter of the sealing section of the middle pipe. Each sealing section abuts against the inner wall of the circular pipe, and there is a gap between the neck section and the inner wall of the circular pipe for the air to pass. When the middle pipe moves relative to the circular pipe and the neck section communicates between the air entrance pipe and the outlet pipe, the glue applicator is adapted to provide air from an external component to the air entrance pipe and allow the air to exit the glue applicator through the neck section and the outlet pipe. When the middle pipe moves relative to the circular pipe so that the neck section leaves the outlet pipe to communicate between the air entrance pipe and the receiving room of the tank and that the inner hollow portion of the middle pipe communicates between the receiving room of the tank and the outlet pipe, the glue applicator is adapted to provide air from the external component to the air entrance pipe and to enter the receiving room of the tank through the neck section, and the air forces the glue into the middle pipe and the inner hollow portion and to exit the glue applicator through the outlet pipe.

Based on the above, the tire repairing device includes both the air supply source and the glue applicator, and both the air supply source and the glue applicator use the cover of the glue applicator as the output path of the air or the glue. Therefore, the middle pipe combined with the glue applicator is movably disposed in the circular pipe of the cover of the glue applicator, so that the movement of the middle pipe can allow the cover to be switched to the inflating path or the glue applying path. Therefore, according to the disclosure, not only an independent inflating function can be performed on the tire, but also a repairing function for applying glue on a damaged tire can be switched to.

DESCRIPTION OF THE EMBODIMENTS

Figure 1:
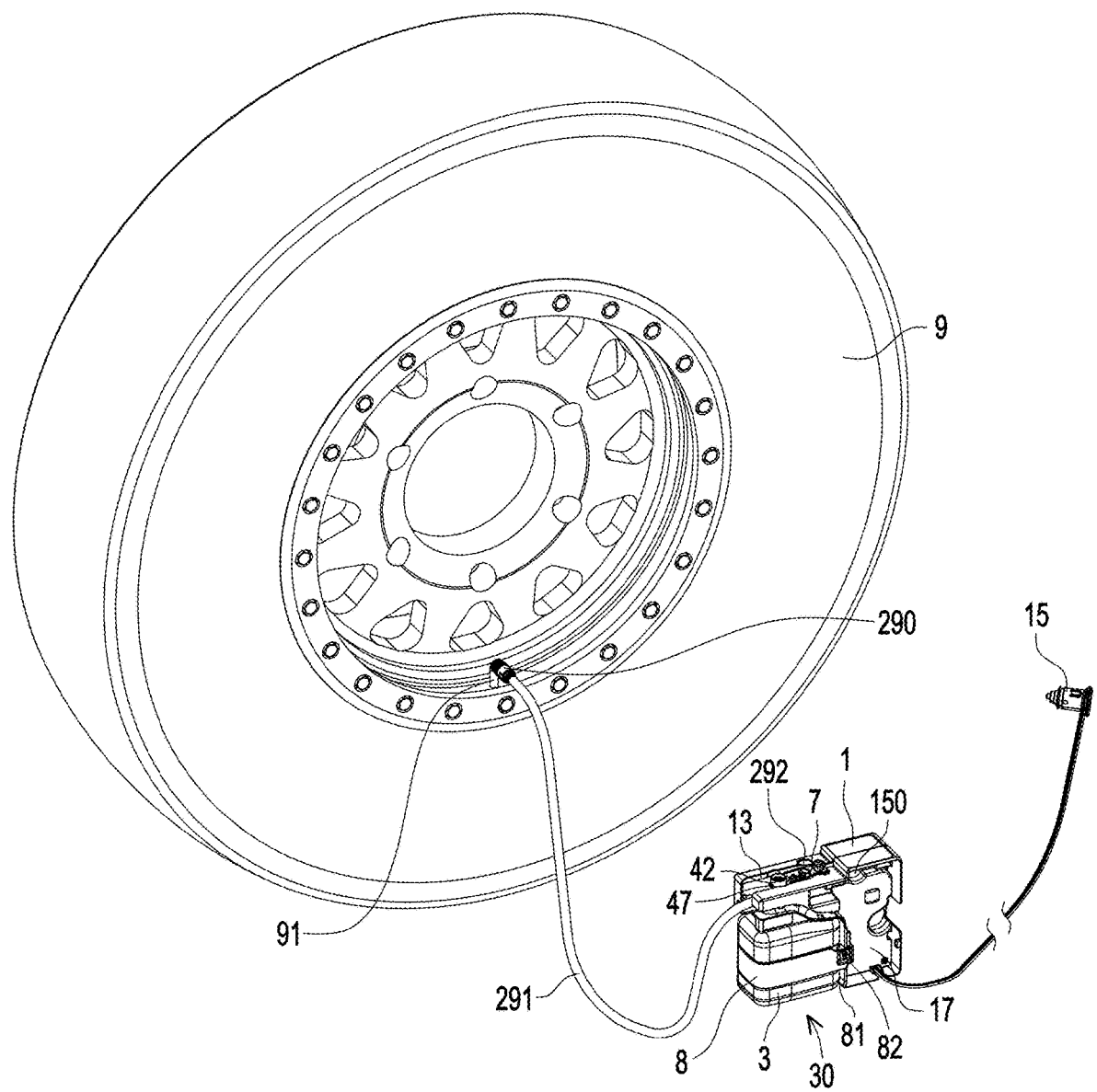
FIG. 1 is a schematic view of a tire repairing device of an embodiment of the disclosure.
Figure 2:
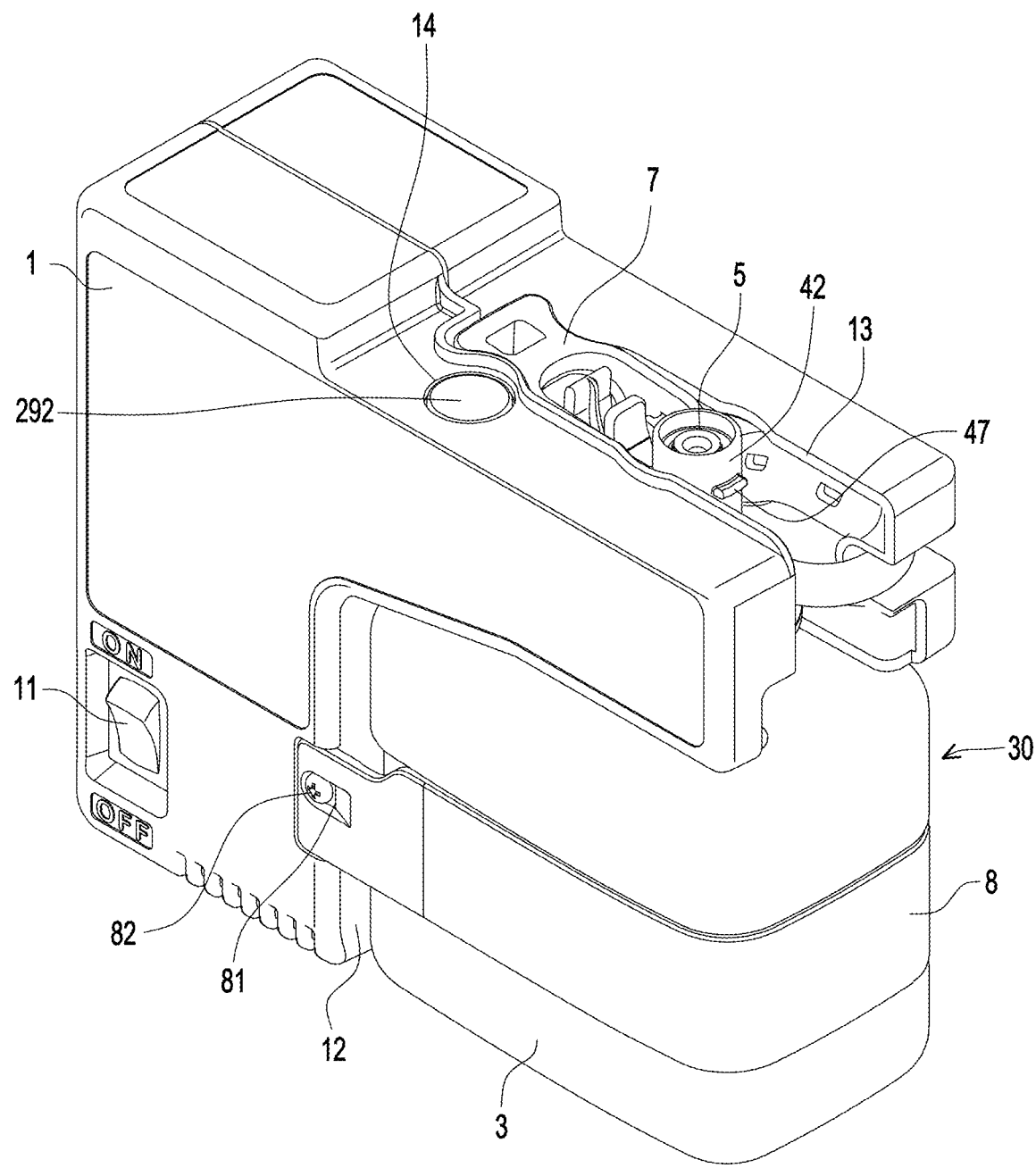
FIG. 2 is a three-dimensional schematic view of the tire repairing device.
Figure 3A:
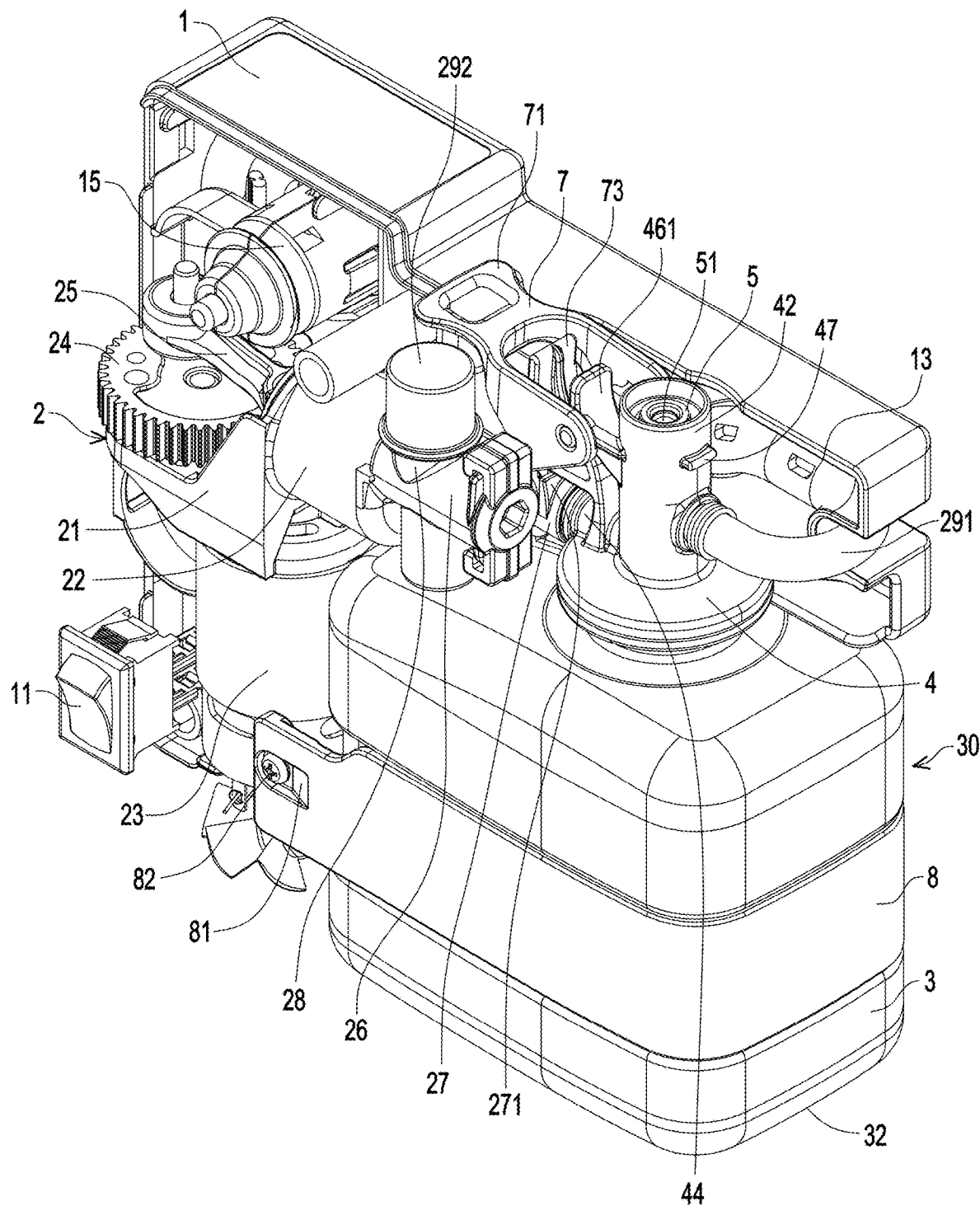
FIG. 3A is a schematic view of some components of the tire repairing device in FIG. 2.

FIG. 1 is a schematic view of a tire repairing device of an embodiment of the disclosure, which shows the working state of the tire repairing device when inflating or applying glue to a tire 9. FIG. 2 is a three-dimensional schematic view of the tire repairing device. FIG. 3A is a schematic view of some components of the tire repairing device in FIG. 2, which omits part of the structure of a box 1 for convenience of identification of an air supply source inside. Please refer to FIG. 1 to FIG. 3A. In this embodiment, the tire repairing device includes the box 1 and a glue applicator 30. There is an air supply source inside the box 1, which is an air compressor 2. The tire repairing device also has a lightweight power plug 15, which may be easily stored on the box 1, or when a user wants to start the device, the power plug 15 may be inserted into a power supply to receive power (not shown). On the outer surface of the box 1, there is a push-type switch 11, a concave external containing space 12, a concave embedding opening 13, a through hole 14, and a power plug storage slot 150. A cover 4 of the glue applicator 30 may be placed in the embedding opening 13, and a tank 3 combined with the cover 4 may be placed in the external containing space 12 of the box 1. The tank 3 is used to hold a glue 34, and the tank 3 of this embodiment is translucent to facilitate identifying the reserve of the glue 34 inside.

Figure 3B:
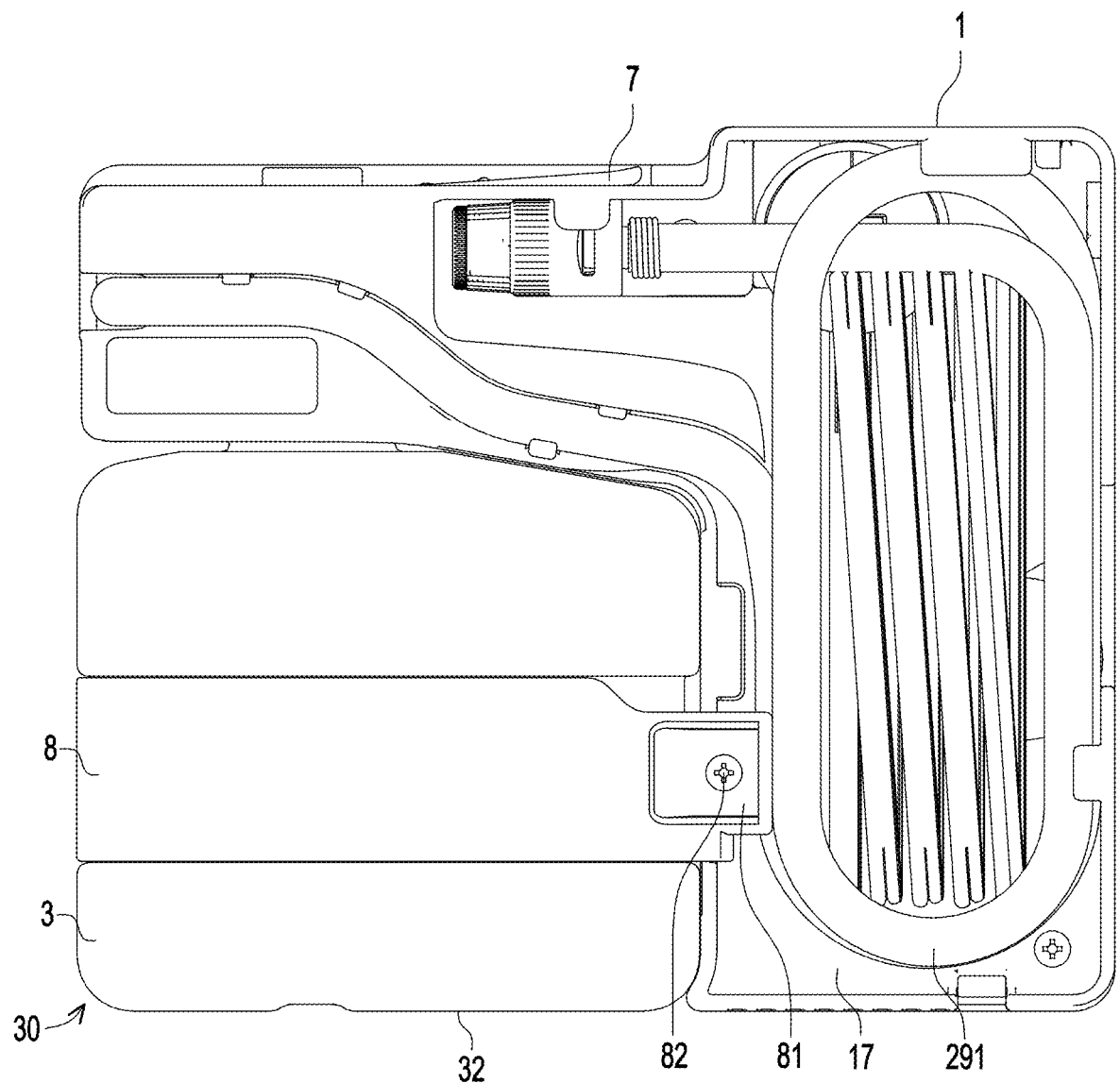
FIG. 3B is a schematic view of the tire repairing device in FIG. 2 on the other side.

FIG. 3B is a schematic view of the tire repairing device in FIG. 2 on the other side. Please refer to FIG. 3B. When the device is not being inflated or applied with the glue, a glue outputting flexible tube 291 connected to an outlet pipe 45 of the glue applicator 30 may be bent to an inner recess portion 17 disposed on a side of the box 1 for storage.

Figure 4:
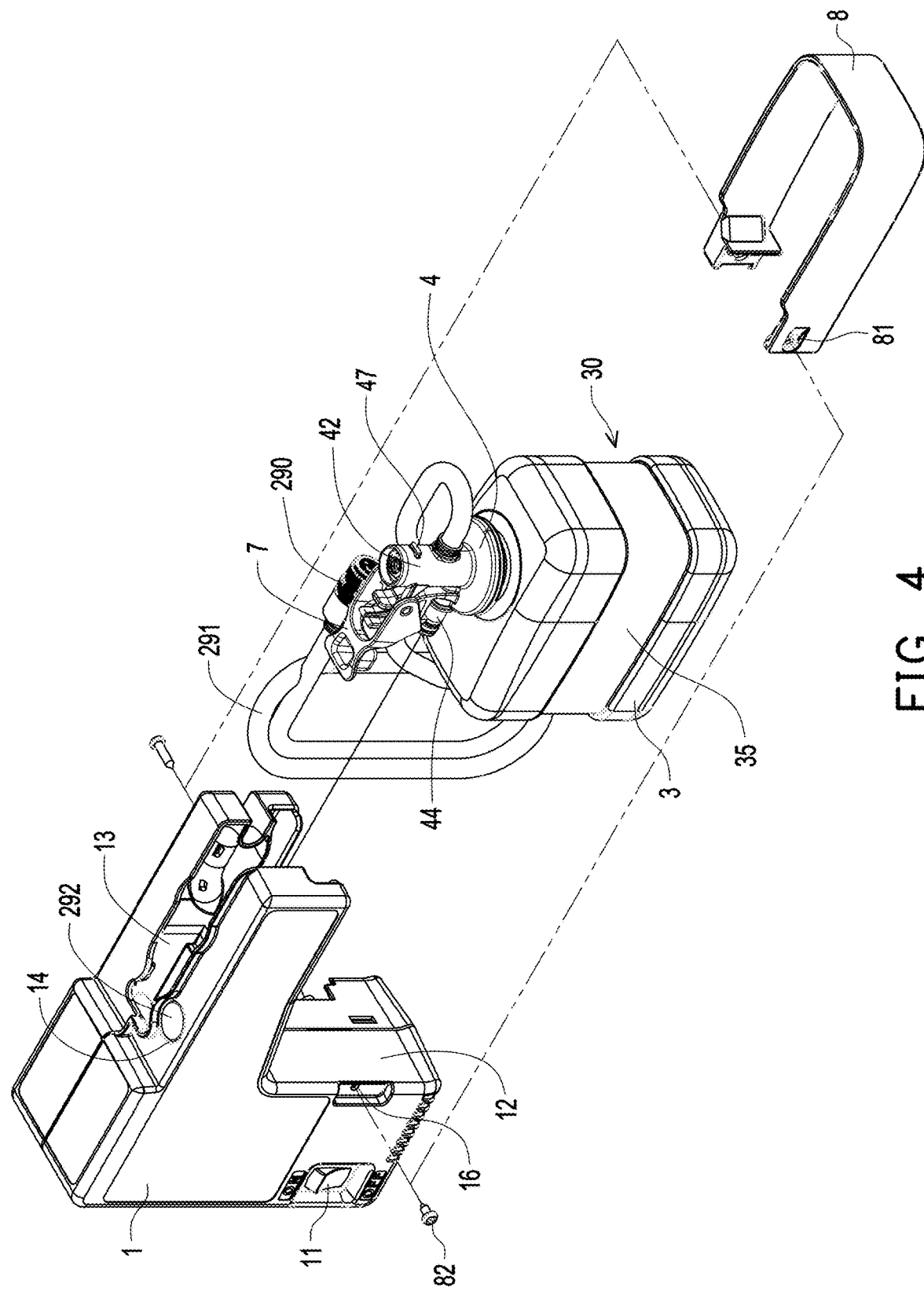
FIG. 4 is an exploded view of the tire repairing device in FIG. 2.
Figure 5:
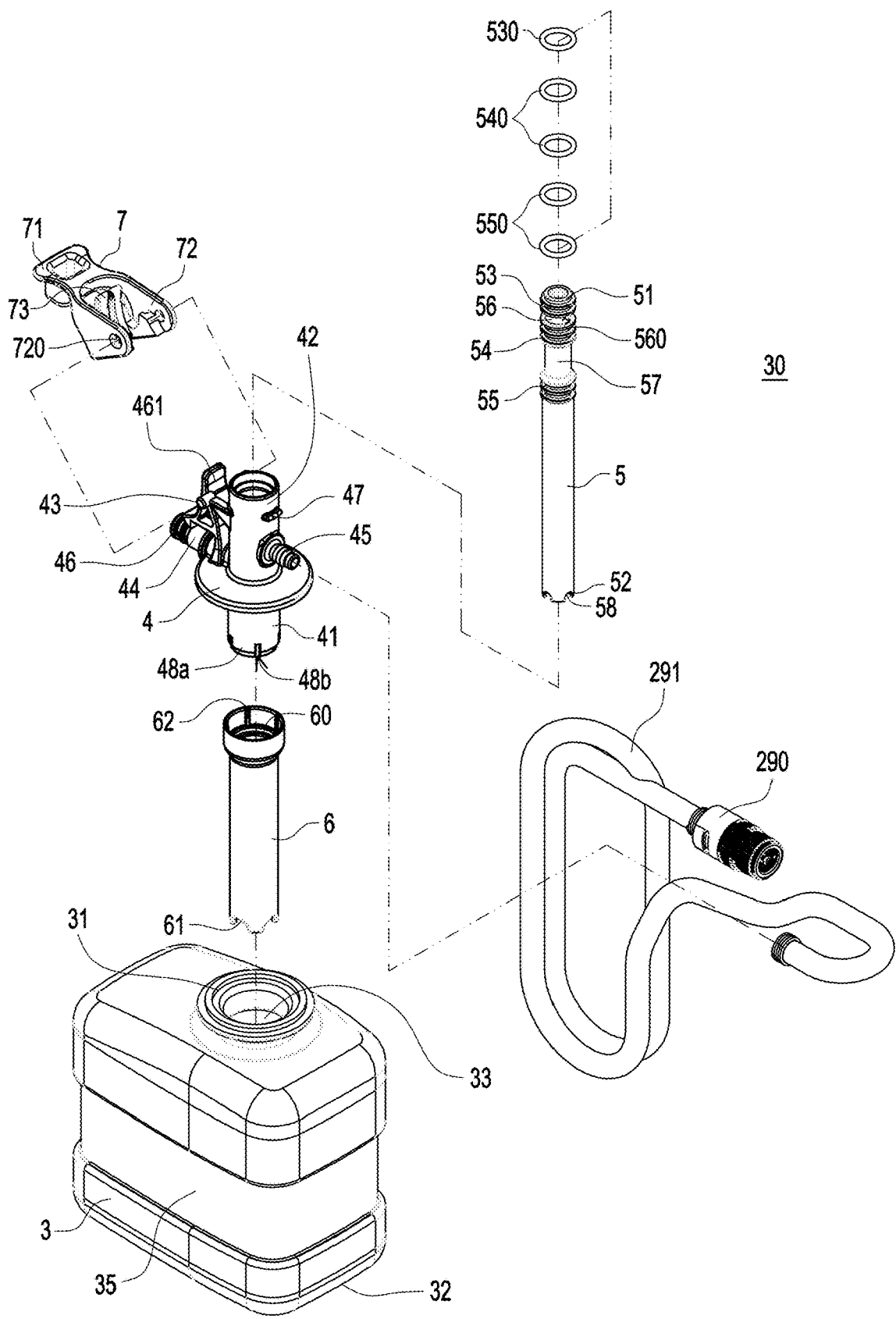
FIG. 5 is an exploded view of the glue applicator.
Figure 6:
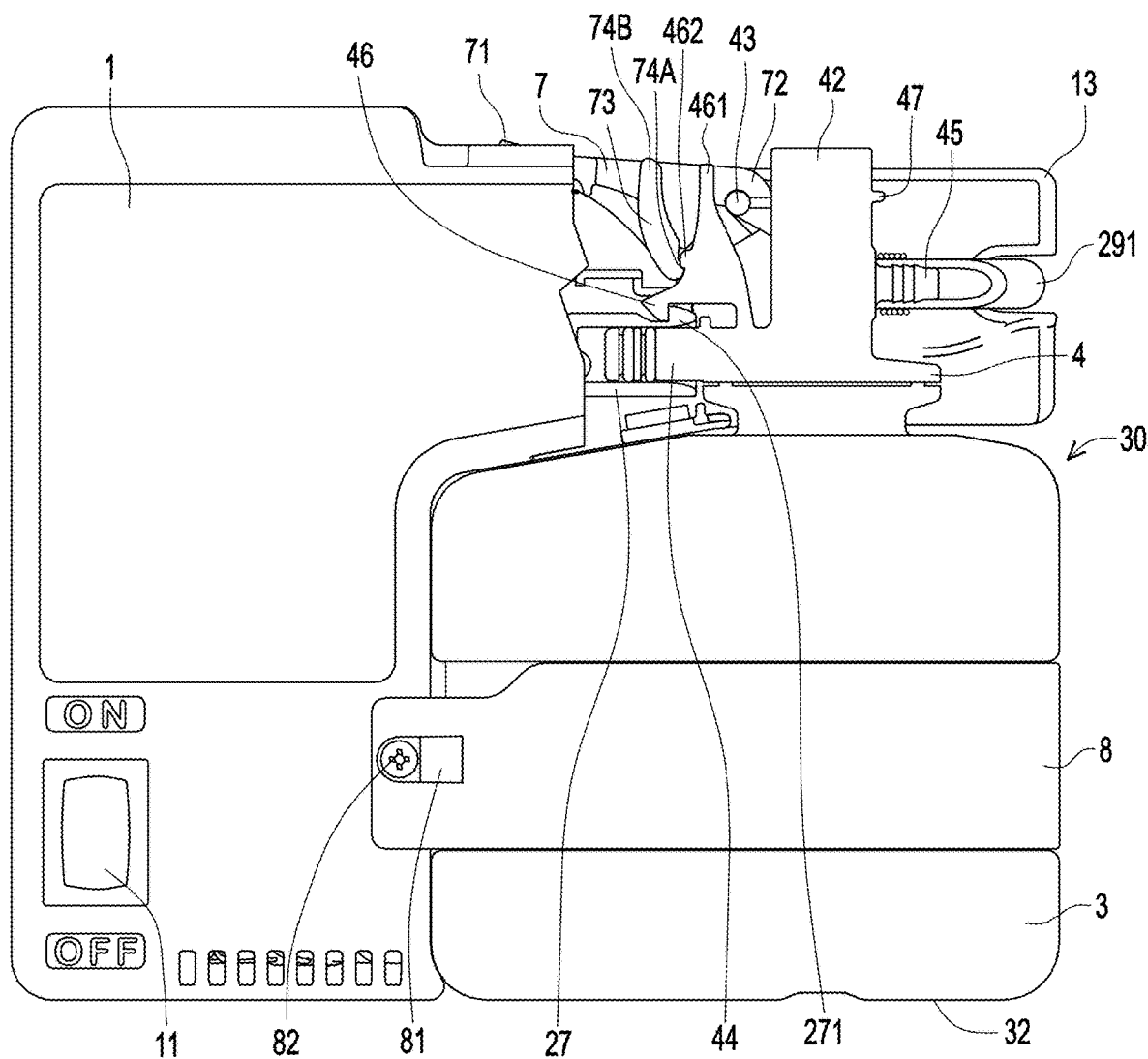
FIG. 6 is a front view of the tire repairing device in FIG. 2.

FIG. 4 is an exploded view of the tire repairing device in FIG. 2. Please refer to FIG. 2, FIG. 3A, FIG. 3B, and FIG. 4 at the same time. The tire repairing device also includes a fixing belt 8, which may surround the outer side of the tank 3 of the glue applicator 30 and positioning seats 81 at both ends of the fixing belt 8 are fixed to positioning holes 16 of the box 1 using locking members 82, so that the glue applicator 30 is stably positioned, and thus fixed to the box 1 and maintain an upright position without tilting or overturning. FIG. 5 is an exploded view of the glue applicator. FIG. 6 is a front view of the tire repairing device in FIG. 2.

Please refer to FIG. 4 to FIG. 6 at the same time. The tire repairing device also includes the glue outputting flexible tube 291, one end thereof is connected to the outlet pipe 45 of the glue applicator 30, and as shown in FIG. 1, the other end of the glue outputting flexible tube 291 has a connector 290, to connect to an air nozzle 91 of the tire 9. As shown in FIG. 3A, FIG. 4, and FIG. 6, when the switch 11 is started, the compressed air generated by the air compressor 2 may enter the tire 9 through an exhaust manifold 27, the inside of the glue applicator 30, and the glue outputting flexible tube 291, which can achieve the function of independent inflation or the function of applying the glue 34 to repair the tire 9 and inflation.

Figure 7:
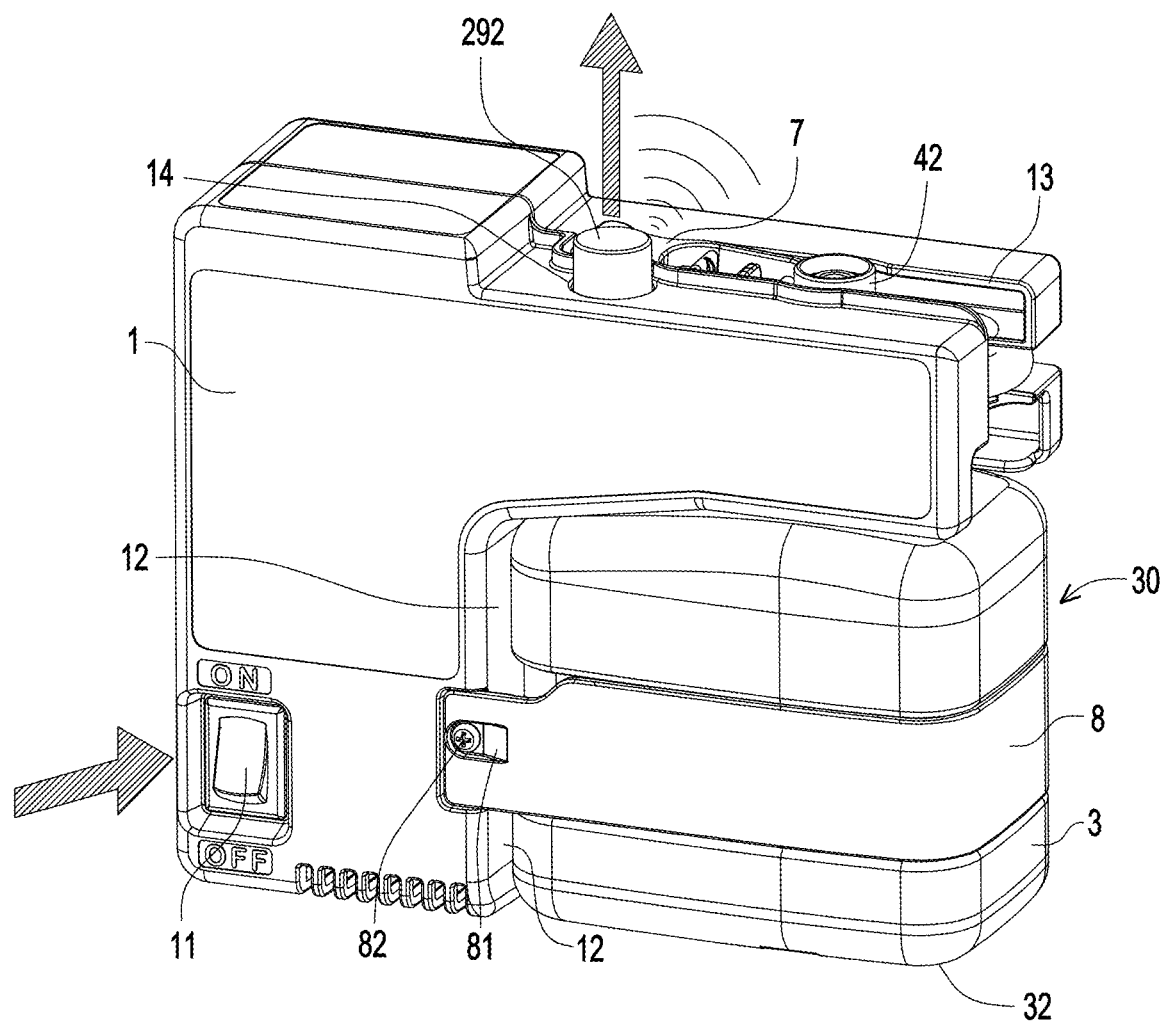
FIG. 7 is a schematic view of a warning state of a warning mechanism.

Further, FIG. 7 is a schematic view of a warning state of a warning mechanism. Referring to FIG. 2 to FIG. 4 first, there is a warning mechanism 292 disposed on the air compressor 2 of the disclosure. Next, referring to FIG. 3A and FIG. 7, when the compressed air generated by the air compressor 2 reaches a pressure set value, a high-frequency vibrating sound is generated, while the warning mechanism 292 rises and reveals the through hole 14 of the box 1 as a reminder to the user, allowing the user to operate the air compressor 2 safely and effectively. In an embodiment, a safety valve (not shown) may be installed in the exhaust manifold 28, so that when the air pressure in an air reservoir seat 26 is higher than the set pressure of the safety valve, the safety valve opens and exhausts excess high-pressure air from the exhaust manifold 28, thereby pushing the warning mechanism 292 up to float. At the same time, the high-frequency vibrating sound is generated when high-pressure air passes through the gap of the safety valve. Accordingly, warning signals can be given to the user visually and audibly.

Figure 8A:
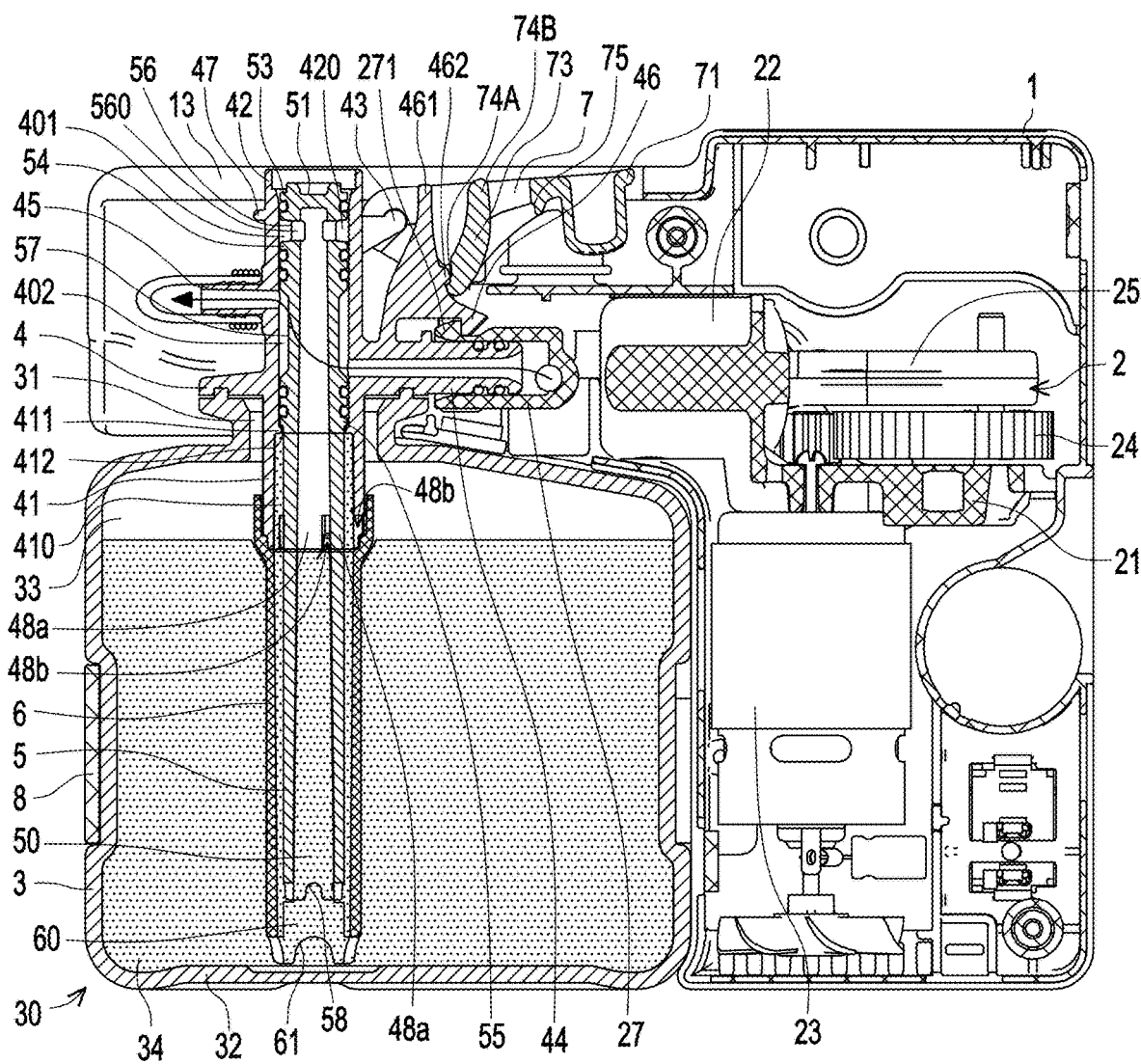
FIG. 8A is a cross-sectional view of the tire repairing device, which shows an inflating state.
Figure 8B:
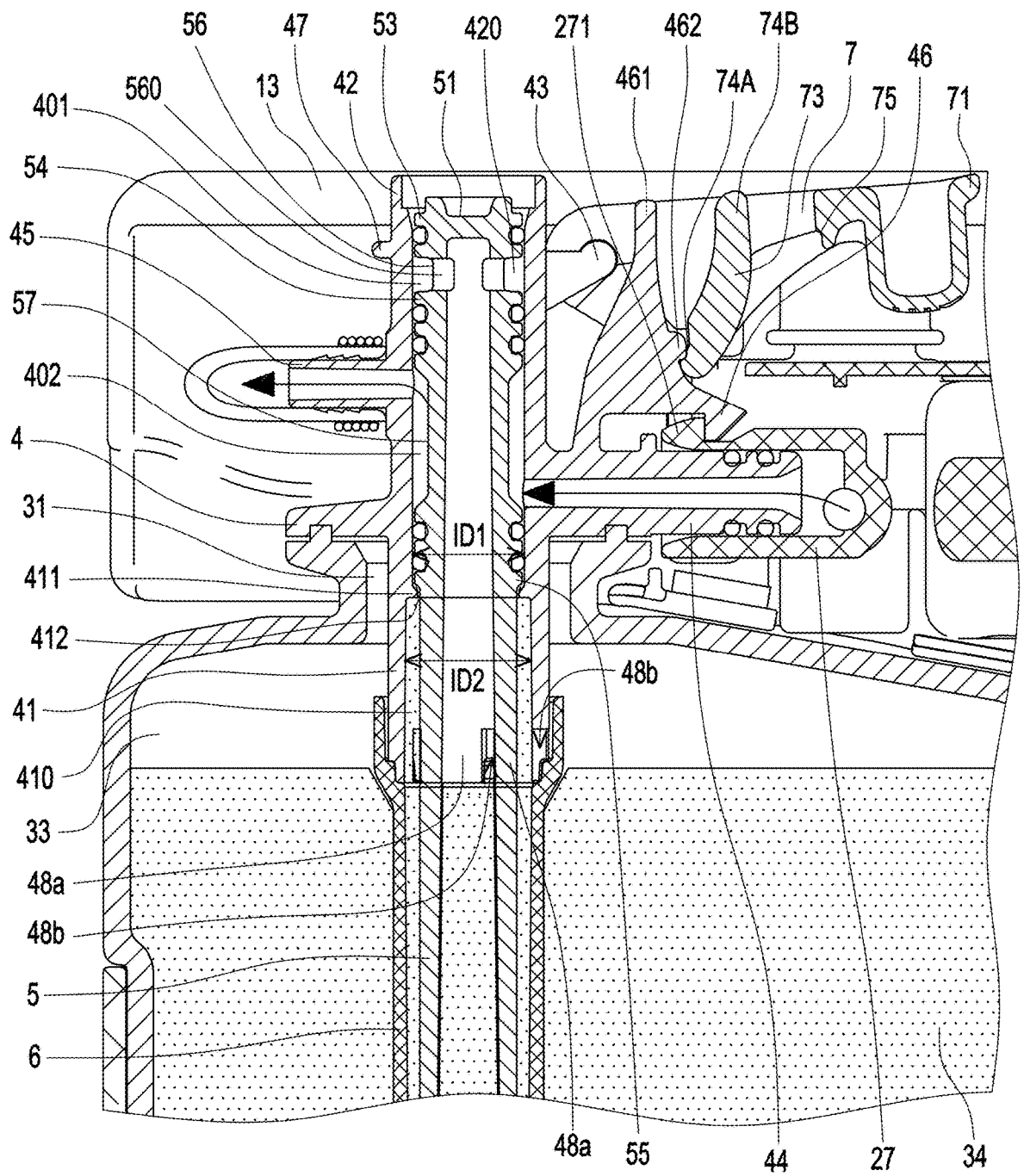
FIG. 8B is a partial enlarged view of FIG. 8A.
Figure 10A:
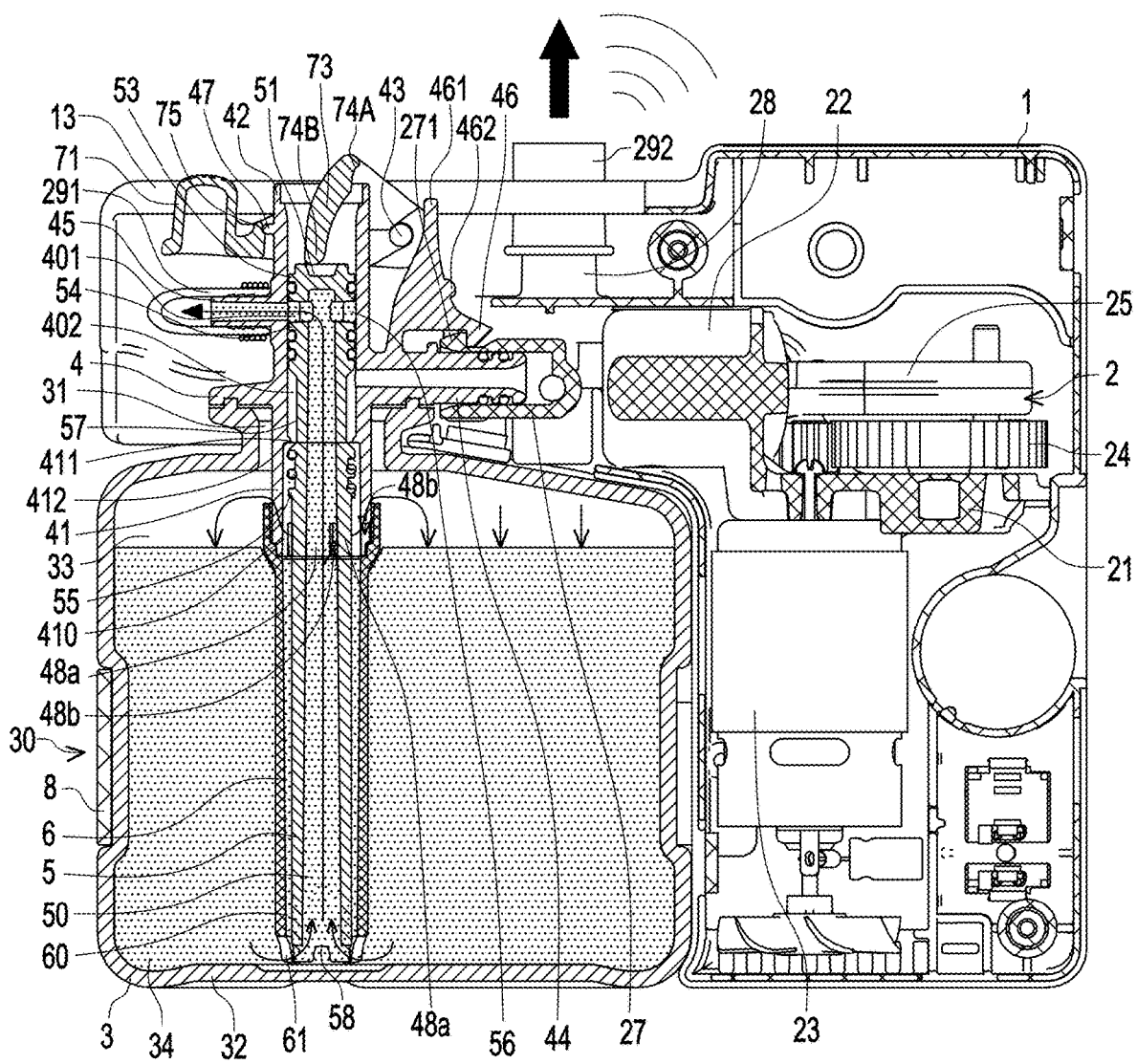
FIG. 10A is a cross-sectional view of the tire repairing device.
Figure 10B:
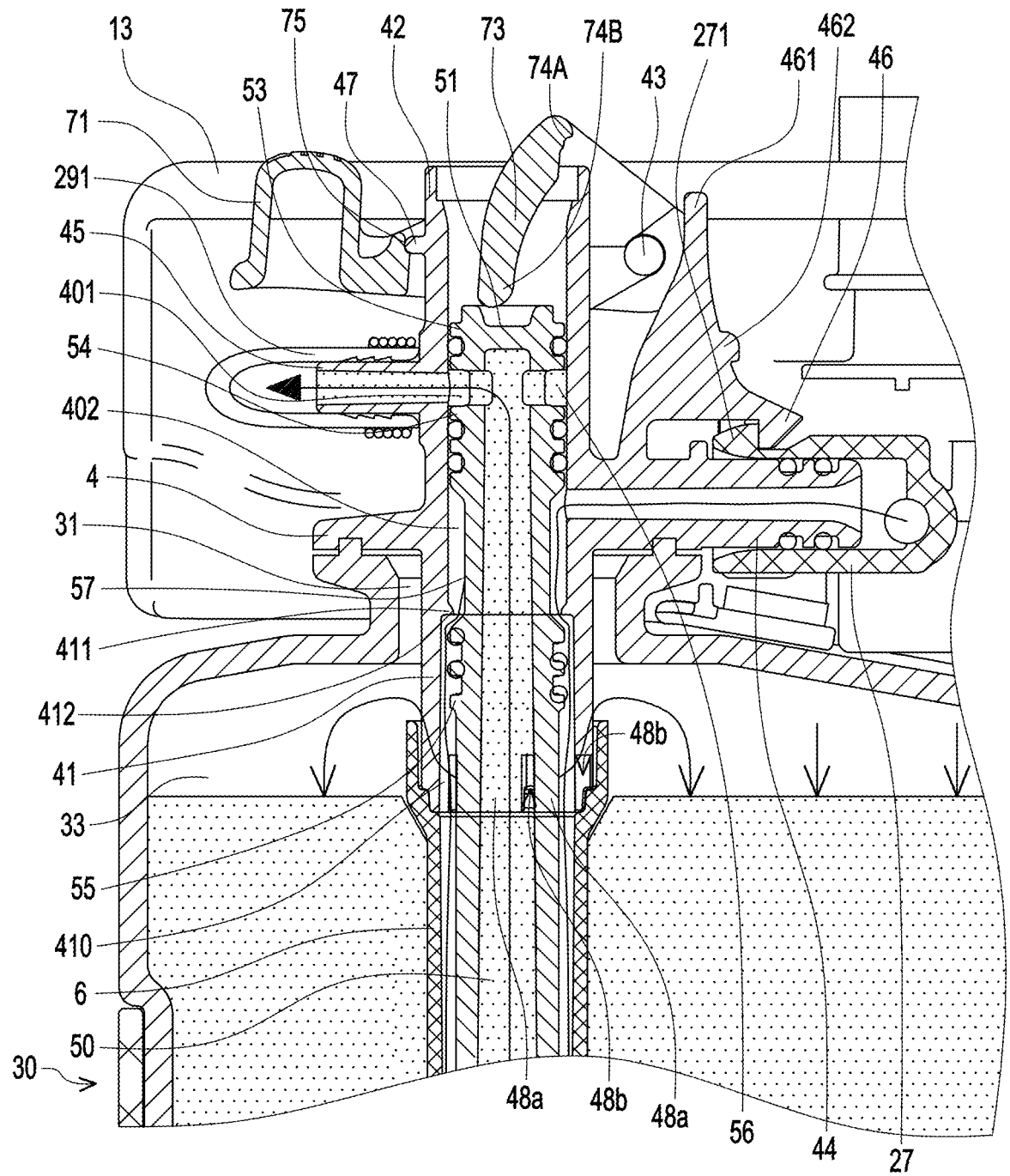
FIG. 10B is a partial enlarged view of FIG. 10A.

FIG. 8A is a cross-sectional view of the tire repairing device, which shows an inflating state. FIG. 8B is a partial enlarged view of FIG. 8A. FIG. 10A is a cross-sectional view of the tire repairing device, which shows a glue applying state and a warning state. FIG. 10B is a partial enlarged view of FIG. 10A.

Please refer to FIG. 6, FIG. 8A, and FIG. 10A first. The air compressor 2 basically has a main frame 21 and a cylinder 22 combined with the main frame 21, while a motor 23 is fixed on the main frame 21. The motor 23 may drive a gear 24 to rotate. The gear 24 simultaneously links a piston 25 located in the cylinder 22. The piston 25 may perform reciprocating motion in the cylinder 22 to generate compression air. There is the air reservoir seat 26 communicated on the cylinder 22, and a plurality of exhaust manifolds 27 and 28 are disposed on the air reservoir seat 26, in which the exhaust manifold 27 is exposed at the embedding opening 13 of the box 1, an air entrance pipe 44 of the glue applicator 30 is connected to the exhaust manifold 27 and is quickly fixed on an embedding plate 271 of the exhaust manifold 27 through a branch structure 46 of the glue applicator 30. As shown in FIG. 6, the air entrance pipe 44 on the glue applicator 30 can be quickly combined with the exhaust manifold 27 of the air compressor 2 to reduce the connection of the pipeline and reduce the volume. Also, the glue applicator 30 can be quickly separated from the air compressor 2 for the convenience of replacing the glue applicator 30 for the tire repair.

Please also refer to FIG. 5. The glue applicator 30 has the tank 3, the cover 4, a middle pipe 5, and an external pipe 6. The tank 3 is hollow inside and has an opening end 31 and a bottom end 32, and a receiving room 33 of the tank 3 may be filled with the glue 34 for applying glue (reference may also be made to FIG. 8A, FIG. 8B, FIG. 10A, and FIG. 10B).

A concave outer ring slot 35 is disposed on an outer peripheral wall of the tank 3. The cover 4 may be combined with the opening end 31 of the tank 3 by screwing or thermal fusion. As shown in FIG. 5, the embodiment uses ultrasonic heat fusion to weld the cover 4 to the opening end 31 of the tank 3.

The cover 4 of this embodiment has a circular pipe, which includes a lower circular pipe 41 and an upper circular pipe 42 extending through each other at the upper and lower ends. In the lower circular pipe 41 and the upper circular pipe 42, there are a lower flow through chamber 410 and an upper flow through chamber 420 that communicate with each other. At the lower flow through chamber 410, a miniature raised wall 411 extending slightly toward the inner diameter is disposed, and a circular hole 412 is formed in the center of the miniature raised wall 411 that can communicate with the lower flow through chamber 410 and the upper flow through chamber 420 (reference may also be made to FIG. 8A and FIG. 8B). With the miniature raised wall 411 as the dividing point, the lower flow through chamber 410 is divided into an upper section portion and a lower section portion. At the miniature raised wall 411 in the downward direction, an inner pipe diameter ID2 of the lower flow through chamber 410 is greater than an inner pipe diameter ID1 of the upper section portion of the lower flow through chamber 410 in the upward direction and the upper flow through chamber 420. That is, the lower section portion is regarded as an expansion section of the circular pipe, and the upper section portion is regarded as a contraction section of the circular pipe.

The top of the upper circular pipe 42 is formed with an opening, the outer peripheral wall of the upper circular pipe 42 is disposed with a pair of pivoting shaft seats 43, and the upper circular pipe 42 is disposed with the air entrance pipe 44 and the outlet pipe 45 that can communicate with the upper flow through chamber 420. The branch structure 46 having a wrench portion 461 is disposed on the air entrance pipe 44, a snapping block 462 is disposed on the wrench portion 461, and a snapping block 47 is disposed on the outer peripheral wall of the upper circular pipe 42 in the upper direction of the outlet pipe 45.

Further, a back side structure of a top end (closed end) of the middle pipe 5 having an inner hollow portion 50, that is, a closed top end slot 51, is exposed to the outside of the circular pipe, while a distal end (open end) of the middle pipe 5 is formed with an opening 52. In addition, at least two separated upper ring walls 53, middle ring wall 54, and lower ring wall 55 are disposed in the outer periphery of the middle pipe 5 at the top end. A first neck ring slot 56 with a small pipe body outer diameter is formed between an upper ring wall 53 and the middle ring wall 54. At least one through hole 560 is disposed at the first neck ring slot 56 to allow the middle pipe 5 to communicate with the inside and outside, and a second neck ring slot 57 with a small pipe body outer diameter is also formed between the middle ring wall 54 and the lower ring wall 55. There are sealing rings 530, 540, and 550 respectively between the two separated upper ring wall 53, middle ring wall 54, and lower ring wall 55, so that the upper ring wall 53 is combined with the sealing ring 530 to form a sealing section, the middle ring wall 54 is combined with the sealing ring 540 to form a sealing section, the lower ring wall 55 is combined with the sealing ring 550 to form a sealing end, the first neck ring slot 56 located between the two sealing sections (the upper ring wall 53 combined with the sealing ring 530, the middle ring wall 54 combined with the sealing ring 540) forms a neck section, and that the second neck ring slot 57 located between the two sealing sections (the middle ring wall 54 combined with the sealing ring 540, the lower ring wall 55 combined with the sealing ring 550) forms a neck section. Here, the sealing section means that after the middle pipe 5 is assembled into the circular pipe, the above structure and the inner wall of the circular pipe form a structure that can block the passage of fluid (air or the glue 34), and the neck section means that a gap is maintained between the above structure and the inner wall of the circular pipe that allows the fluid to pass through.

At least one flow through slot 58 is disposed on the pipe wall of the middle pipe 5 at the distal end. The distal end of the middle pipe 5 may be inserted from the upper circular pipe 42 and passed through from the lower circular pipe 41. At this time, the lower ring wall 55 of the middle pipe 5 may just abut against the miniature raised wall 411 in the cover 4, so that the upper ring wall 53 and middle ring wall 54 of the middle pipe 5 are contained in the upper flow through chamber 420 of the upper circular pipe 42 of the cover 4, and the lower ring wall section 55 of the middle pipe 5 may be contained in the upper section portion of the lower flow through chamber 410 of the lower circular pipe 41 of the cover 4. At this time, displaceable annular gaps 401 and 402 are formed between the inner pipe walls of the first neck ring slot 56 and the second neck ring slot 57 and the lower circular pipe 41 and the upper circular pipe 42.

In this embodiment, a top end of an external pipe 6 having a completely penetrating middle hollow portion 60 is sleeved and fixed at a distal end of the lower circular pipe 41 of the cover 4, at least one flow through groove 61 is disposed on the wall of the external pipe 6 at the distal, and the external pipe 6 covers the outer periphery of the middle pipe 5. As shown in FIG. 5, an end of a wrench 7 is disposed with a driving portion 71, and another end is disposed with a pivoting portion 72 having a shaft hole 720. An abutting column 73 is disposed between the driving portion 71 and the pivoting portion 72, and the abutting column 73 is provided with an end portion 74A. A snapping portion 75 is disposed at the inner side of the driving portion 71. The wrench 7 may be pivoted on the pivoting shaft seat 43 of the upper circular pipe 42 through the shaft hole 720 of the pivoting portion 72. In a state of inflating without simultaneously glue applying, referring to FIG. 8A and FIG. 8B, the end portion 74A of the wrench 7 may be clamped to the snapping block 462 on the wrench portion 461 of the branch structure 46 disposed on the air entrance pipe 44, and a communicating relationship between the air entrance pipe 44 and the outlet pipe 45 of the glue applicator 30 is formed.

Figure 9:
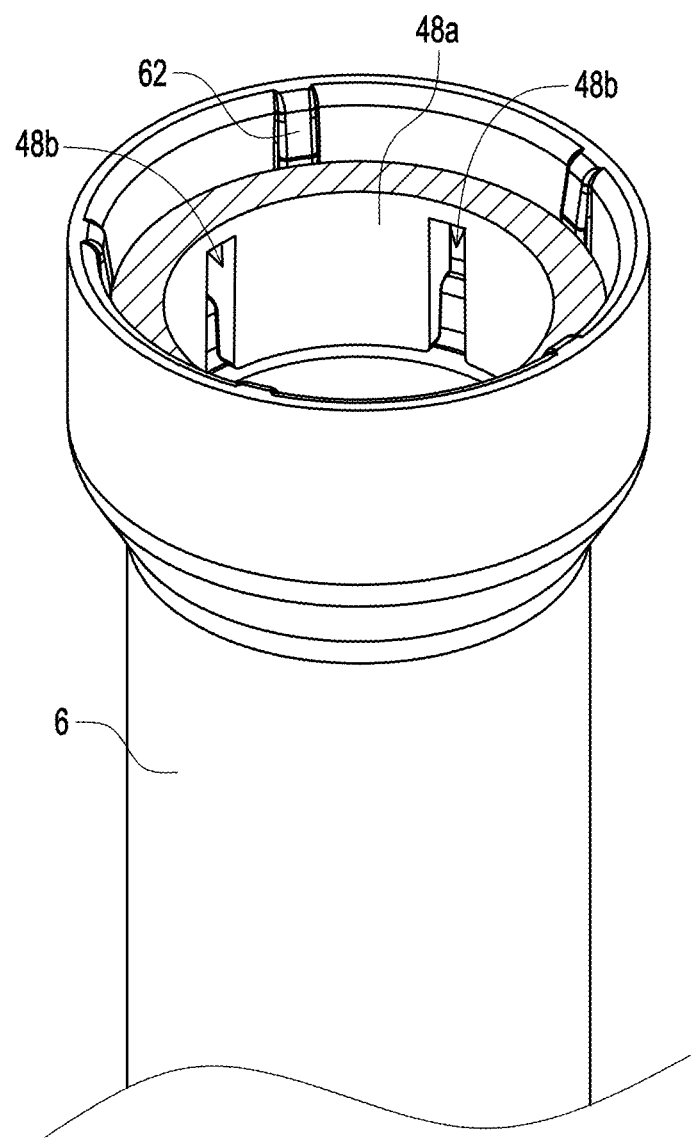
FIG. 9 is a partial cross-sectional view of a circular pipe and an external pipe.

As shown in FIG. 5 and FIG. 9, in this embodiment, multiple opening slots 48b are also disposed at the distal end of the lower circular pipe far away from the upper circular pipe 42, and thus multiple elastic portions 48a are formed. Correspondingly, multiple flange ribs 62 are also has disposed at the connection of the external pipe 6 with the lower circular pipe 41. Accordingly, the external pipe 6 may abut against the elastic portion 48a through the flange rib 62 to fasten the external pipe 6 at the distal end of the lower circular pipe 41 to complete the combination of the external pipe and the circular pipe. Accordingly, when the tire 9 is damaged and needs operations such as inflating and applying glue, referring to FIG. 10A and FIG. 10B, the user controls the wrench 7 to take the shaft hole 720 of the pivoting portion 72 as the swing center, the wrench 7 performs a roughly semicircular pivot point swing, and the snapping portion 75 of the wrench 7 is clamped on the snapping block 47 of the upper circular pipe 42. At this time, another end portion 74B of the abutting column 73 abuts against the closed top end slot 51 at the top end of the middle pipe 5 and pushes the middle pipe 5 to move downward. The middle ring wall 54 of the middle pipe 5 just blocks the communicating relationship between the air entrance pipe 44 and the outlet pipe 45. The high-pressure air entering the upper circular pipe 42 from the air entrance pipe 44 cannot be directly output from the outlet pipe 45 but moved to a place between the lower flow through chamber 410 and the middle hollow portion 60 of the external pipe 6. Due to the existence of the opening slot 48b, the high-pressure air first overflow the external pipe 6 from the opening slot 48b and then flow to the receiving room 33, further squeezing the glue 34 in the tank 3. The glue 34 in the tank 3 enters the inner hollow portion 50 of the middle pipe 5 through the flow through groove 61 at the distal end of the external pipe 6 and the flow through slot 58 at the distal end of the middle pipe 5 and quickly floats upward until the first neck ring slot 56, then starts to flow out into the gap 401 from the through hole 560 and outputs the glue 34 for glue applying along the outlet pipe 45, and then the glue applying function of the glue 34 is performed via the connector 290 on the glue outputting flexible tube 291 exposed outside the box 1, as shown in FIG. 1, which can effectively prevent the air from intermixing with the glue 34 at the flow through groove 61 during the glue applying process and affecting the smoothness of the glue 34 being pulled up.

It should be mentioned that the snapping blocks 462 and 47 can effectively provide a user with a clear positioning hand feel when driving the wrench 7, and the sound generated by the structure collision can also generate a prompting effect for the user. Simply put, by disposing the snapping blocks 462 and 47 at the starting point and the end point of the pivot path of the wrench 7, the operational feeling of the user when driving the wrench 7 is improved.

After the middle pipe 5 and the external pipe 6 are combined on the cover 4 and the cover 4 is connected to the tank 3, the lower circular pipe 41, the external pipe 6, and most of the middle pipe 5 of the cover 4, such as from the lower ring wall 55 to the distal end of the middle pipe 5 are all hidden in the receiving room 33 of the tank 3, as shown in FIG. 8A and FIG. 8B. Please also refer to FIG. 2 and FIG. 4. The fixing belt 8 may be arranged around in the outer ring slot 35 of the tank 3, and the positioning seats 81 at both ends of the fixing belt 8 are fixed to the positioning holes 16 of the box 1 using the locking members 82, so that the glue applicator 30 is stably positioned in a upright position without tilting or overturning.

An initial state of the tire repairing device according to the disclosure may be shown in FIG. 8A and FIG. 8B. The initial state is the inflating state, and the middle pipe 5 is not forced. At this time, the lower ring wall 55 of the middle pipe 5 abuts against the miniature raised wall 411 of the cover 4, causing the lower ring wall 55 of the middle pipe 5 to be blocked at the circular hole 412 of the miniature raised wall 411 of the cover 4, and the high-pressure air generated by the air compressor 2 enters the air entrance pipe 44 of the glue applicator 30 and the upper circular pipe 42 of the cover 4 through the exhaust manifold 27 and flows through the annular gap 402 located in the second neck ring slot 57 of the middle pipe 5. The air entrance pipe 44 and the outlet pipe 45 of the glue applicator 30 form a communicating phenomenon, that is, the outlet pipe 45 directly outputs the high-pressure air to inflate the tire 9 independently. When the compressed air generated by the air compressor 2 reaches the pressure set value, a high-frequency vibrating sound is generated, while the warning mechanism 292 rises and reveals the through hole 14 of the box 1 as a reminder to the user, as shown in FIG. 7.

When the tire 9 is damaged and needs operations such as inflating and applying glue, operations may be switched from FIG. 8A and FIG. 8B to FIG. 10A and FIG. 10B, that is, the wrench 7 is controlled to take the shaft hole 720 of the pivoting portion 72 as the swing center, the wrench 7 performs a roughly semicircular pivot point swing, and the snapping portion 75 of the wrench 7 is clamped on the snapping block 47 of the upper circular pipe 42. At this time, the abutting column 73 abuts against the closed top end slot 51 at the top end of the middle pipe 5 and drives the middle pipe 5 to move downward to reach into the glue 34 in the tank 3. The middle ring wall 54 of the middle pipe 5 just blocks the communicating relationship between the air entrance pipe 44 and the outlet pipe 45, the high-pressure air entering the upper circular pipe 42 from the air entrance pipe 44 cannot be directly output from the outlet pipe 45, instead, the air directly passes through the circular hole 412 of the miniature raised wall 411 in the cover 4, the lower flow through chamber 410 of the lower circular pipe 41, and the middle hollow portion 60 of the external pipe 6 via the gap 402 between the second neck ring slot 57 and the lower circular pipe 41 to enter the receiving room 33 of the tank 3.

Following the above, the high-pressure air entering the receiving room 33 can force the glue 34 in the tank 3, the glue 34 in the tank 3 enters the inner hollow portion 50 of the middle pipe 5 through the flow through groove 61 at the distal end of the external pipe 6 and the flow through slot 58 at the distal end of the middle pipe 5 and quickly floats upward until the first neck ring slot 56, then starts to flow out into the gap 401 from the through hole 560 and outputs the glue 34 for glue applying along the outlet pipe 45, and then the glue applying function of the glue 34 is performed via the connector 290 on the glue outputting flexible tube 291 exposed outside the box 1, as shown in FIG. 7. Here, the technology disclosed in FIG. 8A to FIG. 10B allows the tire repairing device according to the disclosure to not only provide the function of inflating independently, but also when the tire 9 is damaged, it is merely necessary to control the wrench 7 to carry out the function of glue applying and repair.

Figure 11:
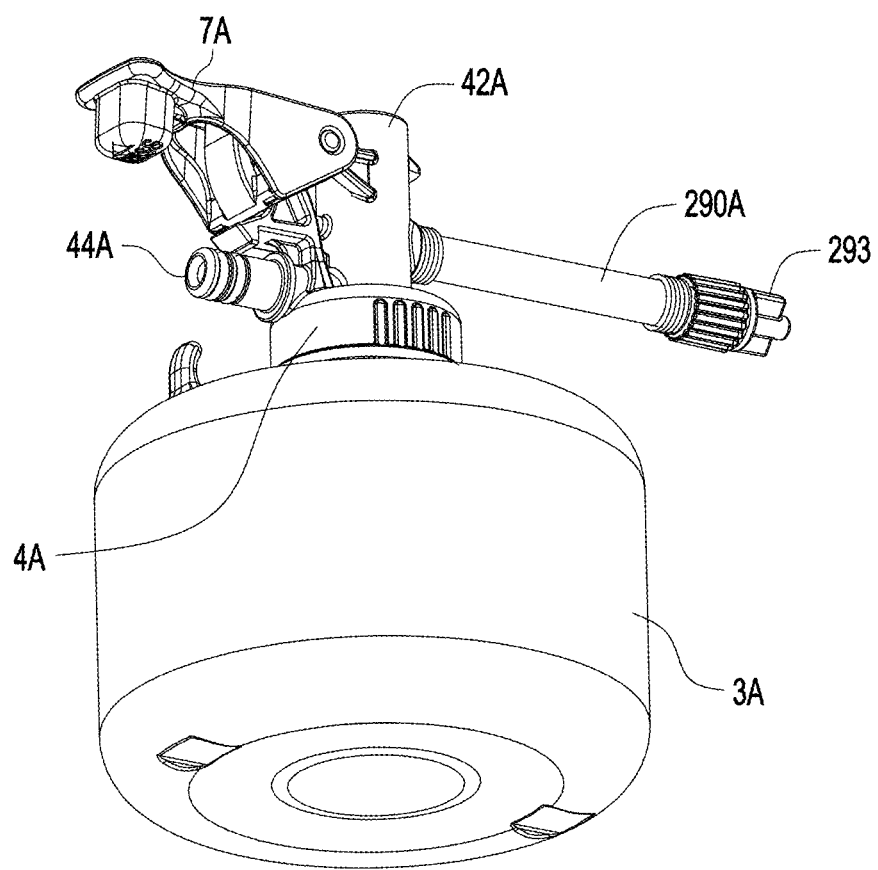
FIG. 11 is a schematic view of a glue applicator according to another embodiment of the disclosure.
Figure 12:
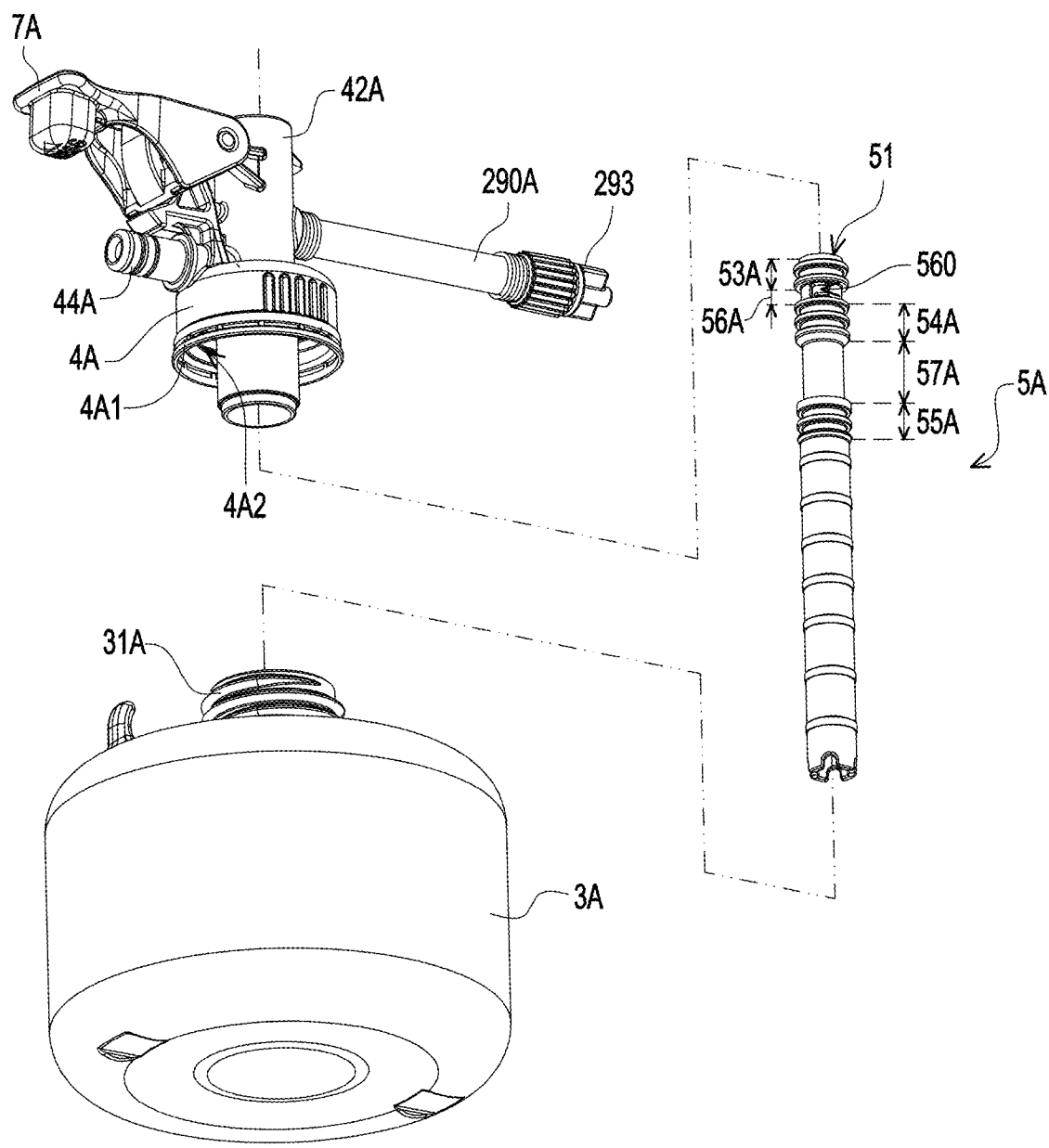
FIG. 12 is an exploded view of the glue applicator in FIG. 11.
Figure 13A:
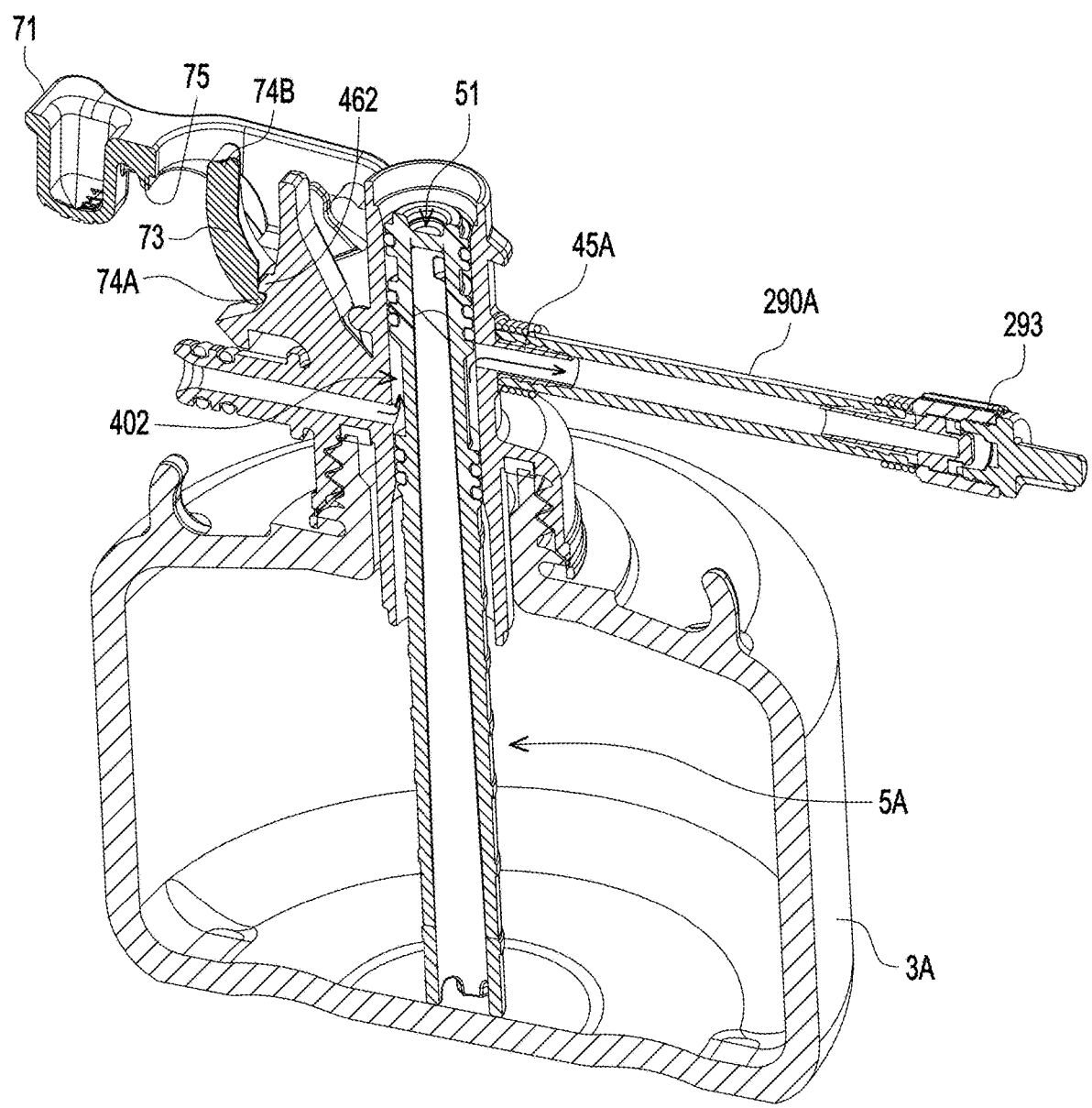
FIG. 13A is a cross-sectional view of the glue applicator in FIG. 11.
Figure 13B:
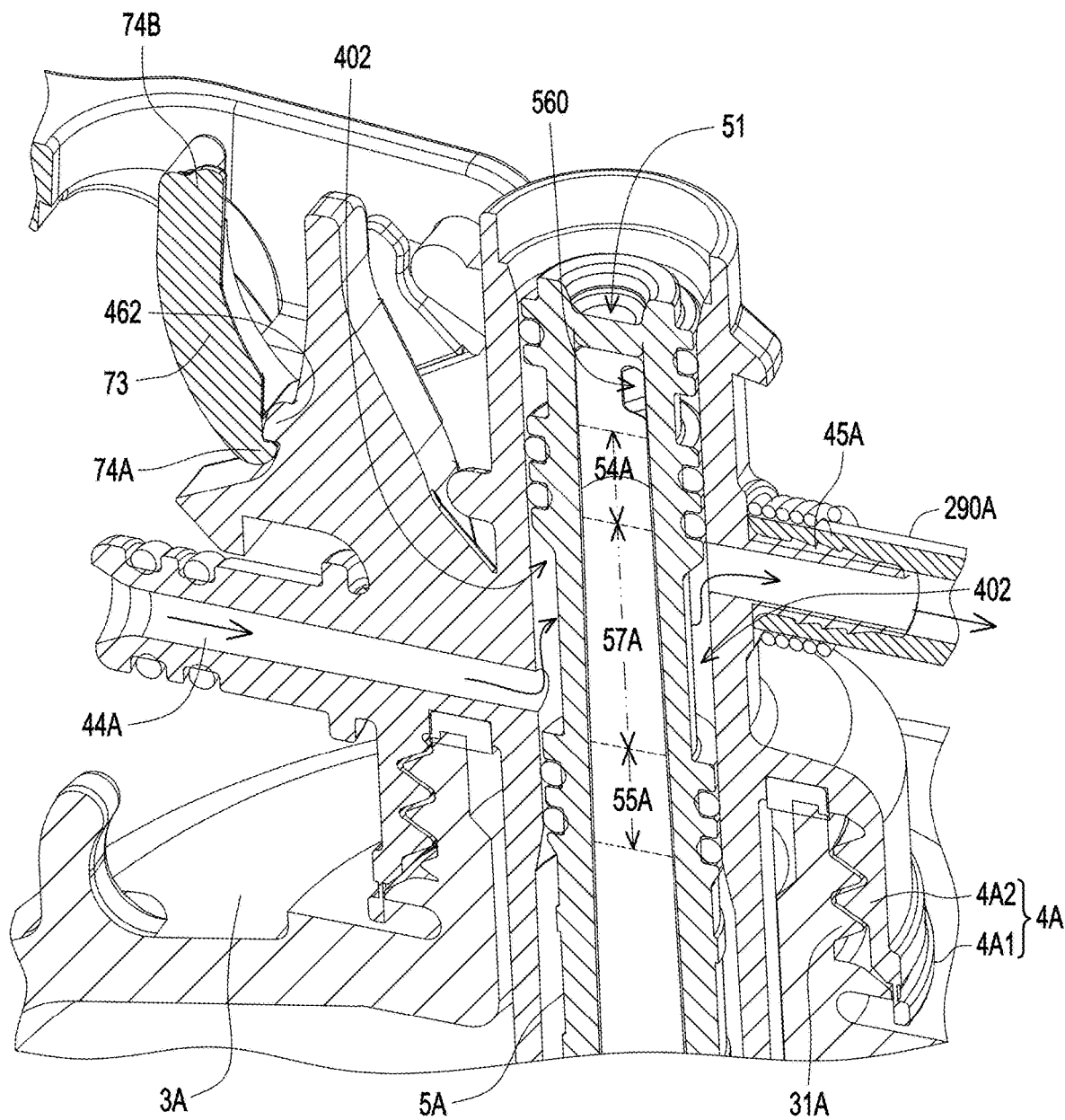
FIG. 13B is a partial enlarged view of FIG. 13A.
Figure 14:
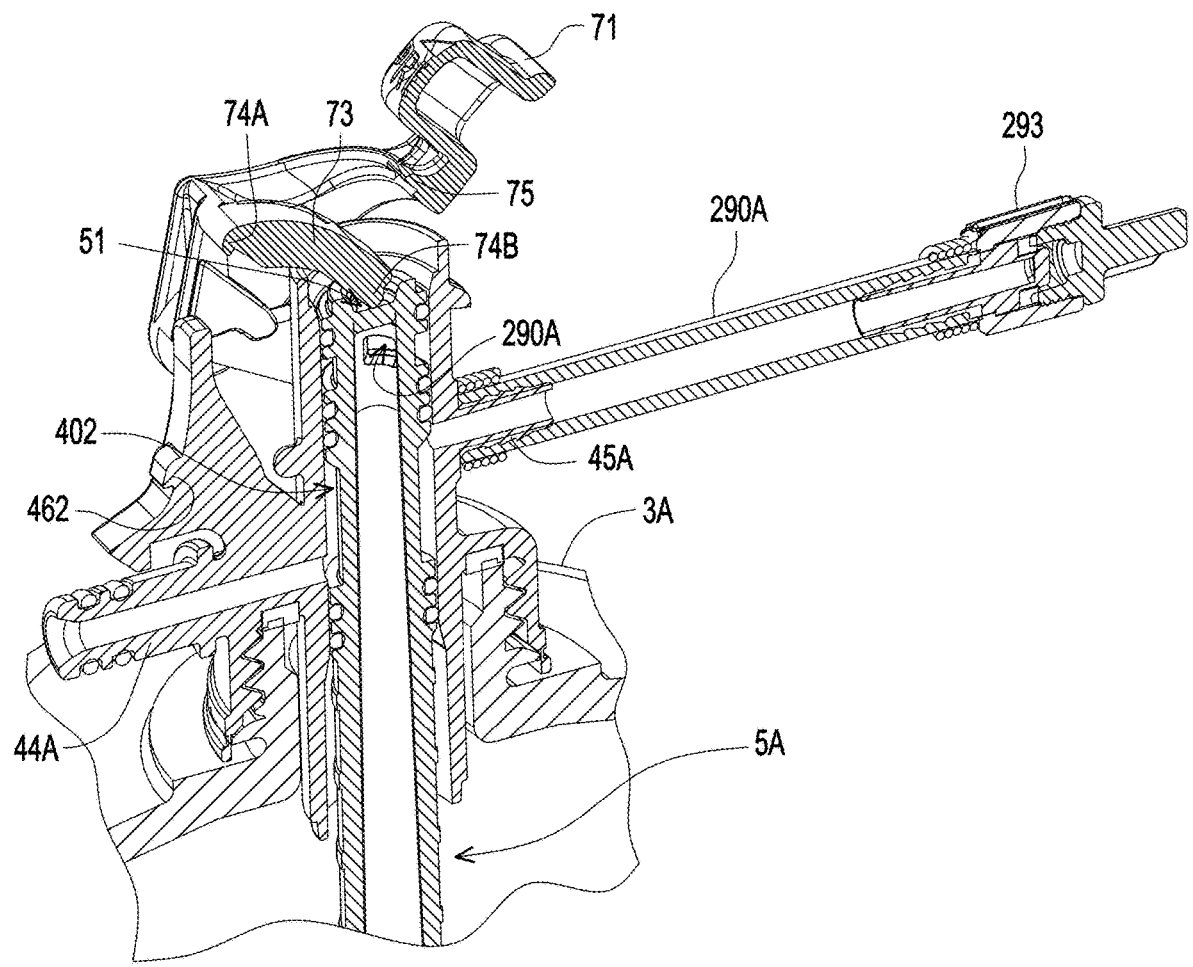
FIG. 14 is a partial cross-sectional view of the glue applicator in FIG. 11 in another state.
Figure 15A:
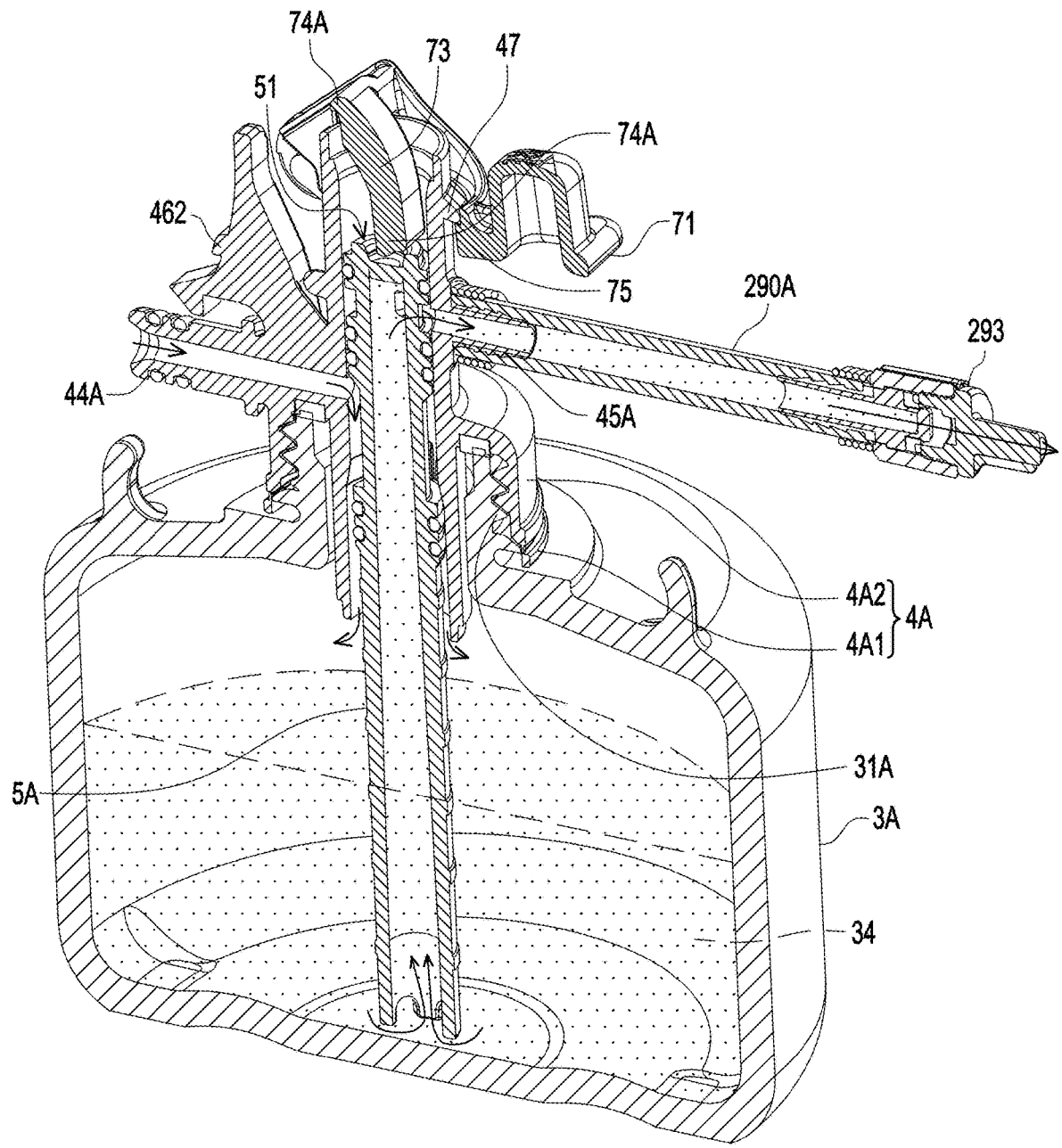
FIG. 15A is a cross-sectional view of the glue applicator in FIG. 11 in another state.
Figure 15B:
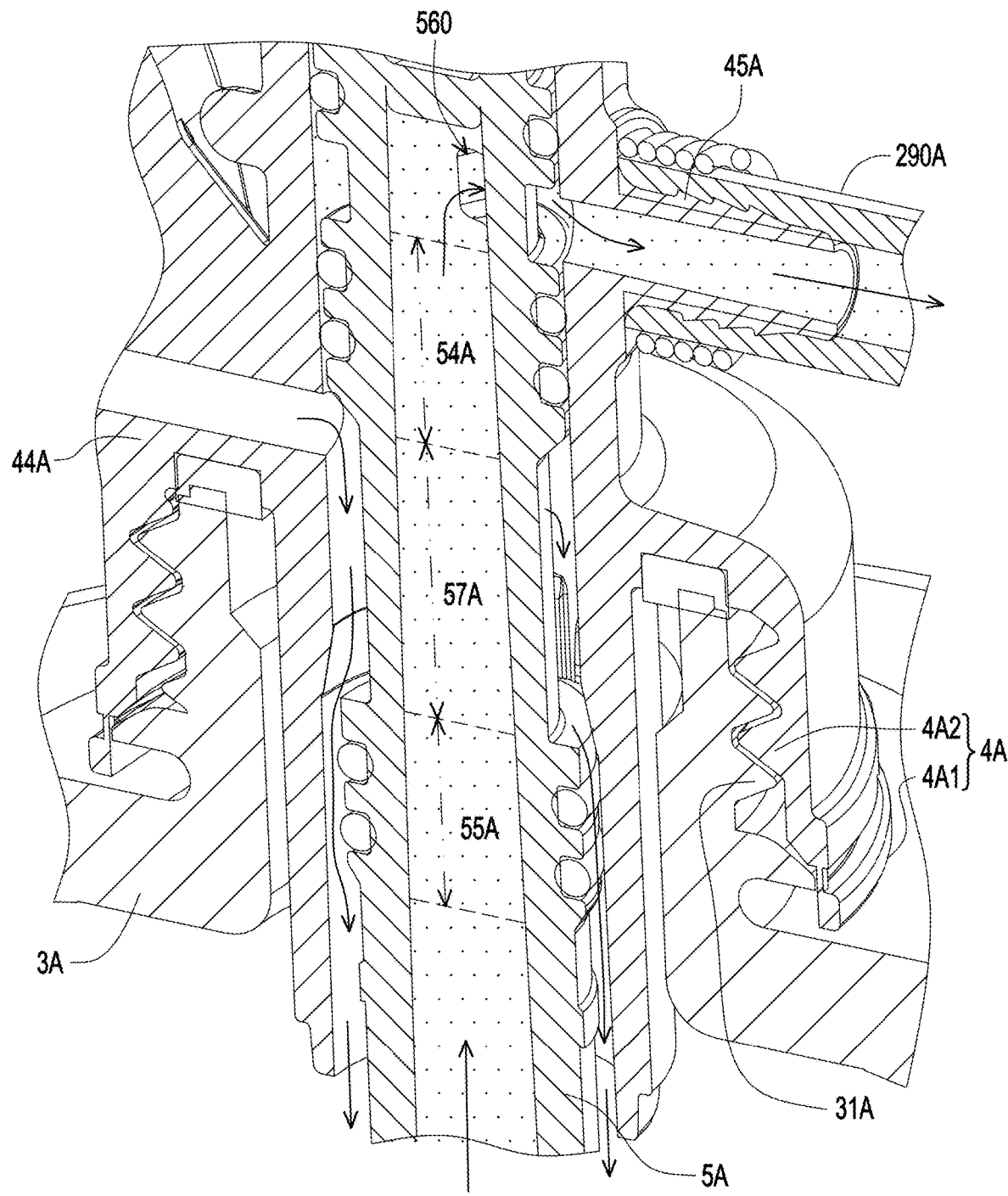
FIG. 15B is a partial enlarged view of FIG. 15A.

FIG. 11 is a schematic view of a glue applicator according to another embodiment of the disclosure. FIG. 12 is an exploded view of the glue applicator in FIG. 11. FIG. 13A is a cross-sectional view of the glue applicator in FIG. 11. FIG. 13B is a partial enlarged view of FIG. 13A. FIG. 14 is a partial cross-sectional view of the glue applicator in FIG. 11 in another state. FIG. 15A is a cross-sectional view of the glue applicator in FIG. 11 in another state. FIG. 15B is a partial enlarged view of FIG. 15A.

Please refer to FIG. 11 and FIG. 12 first. In this embodiment, a glue applicator 30A, similar to the glue applicator 30, may also be assembled into the box 1 and become part of the tire repairing device. The glue applicator 30A of this embodiment includes a tank 3A, a cover 4A, and a middle pipe 5A. The tank 3A is used to hold the glue 34 (shown in FIG. 15A and FIG. 15B). The cover 4A is assembled to the tank 3A. The cover 4A has a circular pipe 42A, an outlet pipe 45A, and an air entrance pipe 44A, the outlet pipe 45A and the air entrance pipe 44A extend from the circular pipe 42A respectively and communicate with the circular pipe 42A. Accordingly, for the glue applicator 30A, an external air supply source (not shown, but reference may be made to the air compressor 2) needs to be connected to provide air to the air entrance pipe 44A to perform the process of inflating or glue applying as mentioned above.

Please refer to FIG. 12, FIG. 13A, and FIG. 13B. The middle pipe 5A is movably disposed in the circular pipe 42A, so that the circular pipe 42A and the middle pipe 5A are coaxially stacked together with each other. The middle pipe 5 has a pair of sealing sections 54A and 55A and a neck section 57A located between the pair of sealing sections 54A and 55A. The outer diameter of the neck section 57A of the middle pipe 5A is less than the outer diameter of the sealing sections 54A and 55A of the middle pipe 5A. Each sealing section 54A, 55A abuts against the inner wall of the circular pipe 42A, and there is the gap 402 between the neck section 57A and the inner wall of the circular pipe 42A for the air to pass.

Different from the aforementioned embodiment, the cover 4A of this embodiment has a fastening ring 4A1 and an internal thread 4A2 to correspond to an external thread 31A of the tank 3A at the opening end. That is, in addition to being connected to the tank 3A through screwing, the cover 4A is further fastened on the neck of the opening end through the fastening ring 4A1 to ensure the tight engagement between threads and the stability between components and to prevent the cover 4A from loosening or falling off due to the threads.

In addition, the process from FIG. 13A and FIG. 13B to FIG. 14, FIG. 14A, and FIG. 15B is the same as the process from FIG. 8A, FIG. 8B, FIG. 10A, and FIG. 10B of the aforementioned embodiment, that is, the driving portion 71 of the wrench 7 is used to receive the force and control of the user, and the wrench 7 is driven to pivot relative to the cover 4A, so that the wrench 7 may switch from the state where the end portion 74A snaps the snapping block 462 to the state where the side edge of the driving portion 71 of the wrench 7 is snapped to another snapping block 47 and the other end portion 74B of the abutting column 73 smoothly pushes the closed top end slot 51 of the middle pipe 5A and presses down, so that the movement of the middle pipe 5A in the circular pipe 42A is the same as the aforementioned embodiment, so as to achieve the same switching effect, which will not be repeated here.

Figure 16:
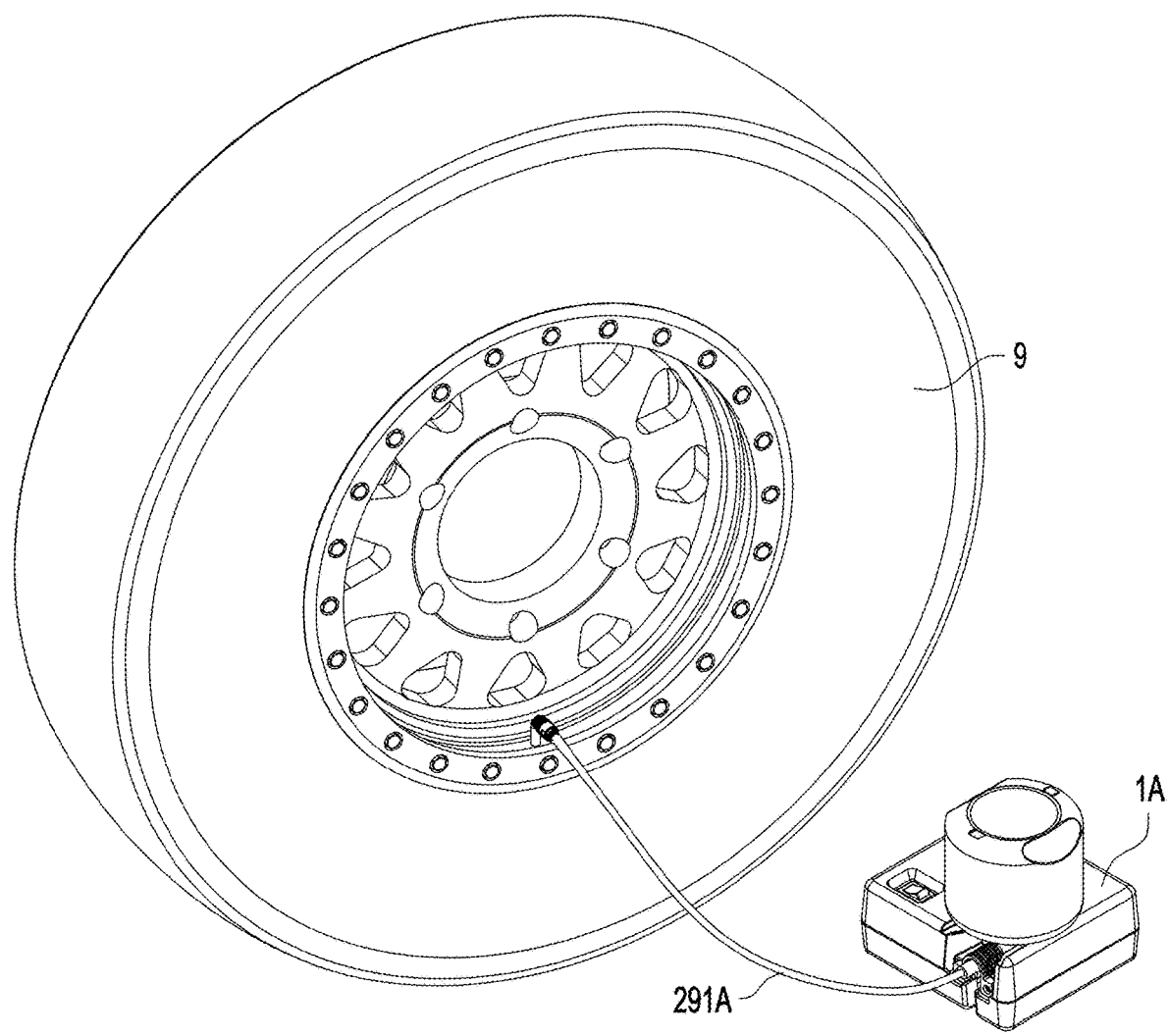
FIG. 16 is a schematic view of a tire repairing device using a horizontal box in the related art.

FIG. 16 is a schematic view of a tire repairing device using a horizontal box in the related art. Please refer to FIG. 1 together with FIG. 16. As shown in FIG. 16, a horizontal box 1A makes the air compressor (not shown) and the glue applying tank (not shown) closer to the ground (compared to the vertical box 1 shown in FIG. 1). On the other hand, the vertical box 1 in FIG. 1 can elevate the components of the air compressor relative to the ground. Therefore, when facing an operating environment on a rainy day or with water on the road, the design can prevent the components from being immersed in water and avoid the risk of metal corrosion due to moisture. In addition, a glue outputting flexible tube 291A shown in FIG. 16 has a significant distance gap from the tire 9 due to the horizontal box 1A, so the designer needs to increase the length of the glue outputting flexible tube 291A accordingly. In contrast, as shown in FIG. 1, the disclosure adopts the vertical box 1, which can effectively reduce the distance difference between the box 1 and the tire 9, and thus the length requirement of the glue outputting flexible tube 291 can be reduced, thereby the manufacturing cost is reduced and the operational convenience is improved.

In summary, in the embodiments of the disclosure, since the middle pipe can move within the circular pipe, the tightness of the sealing section and the neck section, as well as the inner and outer diameters of the middle pipe and circular pipe, are used, and thus the movement process of the middle pipe can cause switching between fluid transfer paths, so that in addition to providing the function of glue applying, the tire repairing device can also achieve the additional function of inflating the tire, which provides the user with different functional options, thereby the operational flexibility is provided and the requirement of the tire repairing process is met.

What is claimed is:

1. A tire repairing device for inflating or applying glue to a tire, wherein the tire repairing device comprises:
   a box;
   an air supply source disposed in the box;
   a glue applicator, comprising:
      a tank having a receiving room for holding the glue;
      a cover assembled to the tank, wherein the cover has a circular pipe, an outlet pipe, an air entrance pipe, and a pair of snapping blocks, wherein the pair of snapping blocks are located at two opposite sides of the circular pipe, and the outlet pipe and the air entrance pipe extend from the circular pipe respectively and communicate with the circular pipe, and the air supply source is connected to the air entrance pipe and provides air thereto;
      a wrench pivotally connected to the cover, wherein the wrench has a pivoting portion, a driving portion, and an abutting column, wherein the pivoting portion is pivoted to a branch structure of the cover, the branch structure is adjacent between the circular pipe and the air entrance pipe, the abutting column is located between the pivoting portion and the driving portion; and
      a middle pipe movably disposed in the circular pipe so that the circular pipe and the middle pipe are coaxially stacked together with each other, wherein the middle pipe has a pair of sealing sections and a neck section located between the pair of sealing sections, an outer diameter of the neck section of the middle pipe is less than an outer diameter of the sealing section of the middle pipe, each of the sealing sections abuts against an inner wall of the circular pipe, and there is a gap between the neck section and the inner wall of the circular pipe for the air to pass,
   wherein during an inflating process, the neck section communicates between the air entrance pipe and the outlet pipe, so that the air passes through the air entrance pipe, the neck section, and the outlet pipe sequentially to enter the tire,
   during a glue applying process, the neck section communicates between the air entrance pipe and the receiving room of the tank, an inner hollow portion of the middle pipe communicates between the receiving room of the tank and the outlet pipe, the air enters the receiving room through the air entrance pipe and the neck section sequentially, and the air forces the glue into the inner hollow portion of the middle pipe to enter the tire through the outlet pipe,
   wherein during the inflating process, the wrench is away from the middle pipe to expose a part of the circular pipe, and the wrench is adapted to receive a force to pivot relative to the cover and push the middle pipe to drive the middle pipe to move relative to the circular pipe to a position where the glue applying process is able to be performed,
   wherein in response to the wrench moving to one of the two opposite ends, an end portion of the abutting column is fastened to one of the pair of snapping blocks, in response to the wrench moving to the other one of the two opposite ends, another end portion of the wrench presses against the middle pipe to expose the part of the circular pipe, and the end portion and the another end portion are two opposite end portions of the abutting column, and in response to the wrench moving to the other one of the two opposite ends, a side edge of the driving portion is fastened to the other one of the pair of snapping blocks, wherein the pair of snapping blocks are located at two opposite ends of a pivot path of the wrench to fasten the wrench moved to the end.

2. The tire repairing device as claimed in claim 1, wherein the circular pipe has a contraction section and an expansion section, an inner pipe diameter of the circular pipe in the expansion section is greater than an inner pipe diameter of the circular pipe in the contraction section, the air entrance pipe and the outlet pipe communicate with the contraction section of the circular pipe respectively, the expansion section communicates with the receiving room of the tank, during the inflating process, the pair of sealing sections of the middle pipe abut against the contraction section of the circular pipe, and during the glue applying process, the contraction section communicates with the expansion section through the neck section.

3. The tire repairing device as claimed in claim 1, wherein the inner hollow portion of the middle pipe has a through hole as well as an open end and a closed end opposite to each other, the open end reaches into the receiving room and is immersed in the glue, the through hole is located between the open end and the closed end, the pair of sealing sections and the neck section are located between the through hole and the open end, during the inflating process, one of the sealing sections block between the through hole and the outlet pipe, and during the glue applying process, the inner hollow portion communicates with the outlet pipe through the through hole.

4. The tire repairing device as claimed in claim 3, wherein the middle pipe further has another sealing section, the through hole is located between one of the pair of sealing sections and the another sealing section, and the middle pipe forms a necking phenomenon at the through hole.

5. The tire repairing device as claimed in claim 3, wherein a back side structure of the closed end is exposed outside the circular pipe, and the middle pipe moves relative to the circular pipe by applying an external force to the back side structure.

6. The tire repairing device as claimed in claim 1 further comprises an external pipe sleeved at the circular pipe, communicating with the middle pipe, and located in the tank, wherein an end of the external pipe away from the circular pipe is immersed in the glue.

7. The tire repairing device as claimed in claim 1, wherein the air supply source is an air compressor disposed in the box.

8. The tire repairing device as claimed in claim 7, wherein the air compressor has a warning mechanism disposed in an exhaust manifold of the air compressor, so that in response to compressed air provided by the air compressor exceeds a preset value, the compressed air drives the warning mechanism to rise, generate a vibrating sound, and be exposed to the box.

9. The tire repairing device as claimed in claim 7, wherein the box is formed in an L-shape, the air compressor is disposed in the L-shaped body, a branch of the L-shaped body has an embedding opening, the cover of the glue applicator is detachably clamped at the embedding opening, so that the tank of the glue applicator is stored in an external containing space of the L-shaped body, the tire repairing device further comprises a fixing belt surrounding the tank and detachably fastened to the L-shaped body to fix the tank and maintain an upright position of the tank, and the tank is translucent for identifying the glue inside.

10. A glue applicator, comprising:
a tank having a receiving room for holding a glue;
a cover assembled to the tank, wherein the cover has a circular pipe, an outlet pipe, an air entrance pipe, and a pair of snapping blocks, wherein the pair of snapping blocks are located at two opposite sides of the circular pipe, and the outlet pipe and the air entrance pipe extend from the circular pipe respectively and communicate with the circular pipe;
a wrench pivotally connected to the cover, wherein the wrench has a pivoting portion, a driving portion, and an abutting column, the pivoting portion is pivoted to a branch structure of the cover, the branch structure is adjacent between the circular pipe and the air entrance pipe, the abutting column is located between the pivoting portion and the driving portion, and the pair of snapping blocks are located at two opposite ends of a pivot path of the wrench to fasten the wrench moved to the end; and
a middle pipe movably disposed in the circular pipe so that the circular pipe and the middle pipe are coaxially stacked together with each other, wherein the middle pipe has a pair of sealing sections and a neck section located between the pair of sealing sections, an outer diameter of the neck section of the middle pipe is less than an outer diameter of the sealing section of the middle pipe, each of the sealing sections abuts against an inner wall of the circular pipe, and there is a gap between the neck section and the inner wall of the circular pipe for air to pass,
wherein in response to the middle pipe moving relative to the circular pipe and the neck section communicating between the air entrance pipe and the outlet pipe, the glue applicator is adapted to provide the air from an external air supply source to the air entrance pipe and allow the air to exit the glue applicator through the neck section and the outlet pipe, so that the air supply source performs inflating on a tire through the glue applicator,
in response to the middle pipe moving relative to the circular pipe so that the neck section leaves the outlet pipe to communicate between the air entrance pipe and the receiving room of the tank and that an inner hollow portion of the middle pipe communicates between the receiving room of the tank and the outlet pipe, the glue applicator is adapted to provide the air from the air supply source to the air entrance pipe to enter the receiving room of the tank through the neck section, and the air forces the glue into the middle pipe and the inner hollow portion to exit the glue applicator through the outlet pipe, so that the air supply source drives the glue applicator to perform glue applying on the tire,
wherein during the inflating, the wrench is away from the middle pipe to expose a part of the circular pipe, and the wrench is adapted to receive a force to pivot relative to the cover and push the middle pipe to drive the middle pipe to move relative to the circular pipe to a position where the glue applying is able to be performed,
wherein in response to the wrench moving to one of the two opposite ends, an end portion of the abutting column is fastened to one of the pair of snapping blocks, in response to the wrench moving to the other one of the two opposite ends, another end portion of the wrench presses against the middle pipe to expose the part of the circular pipe, and the end portion and the another end portion are two opposite end portions of the abutting column, and in response to the wrench moving to the other one of the two opposite ends, a side edge of the driving portion is fastened to the other one of the pair of snapping blocks.

11. The glue applicator as claimed in claim 10, wherein the circular pipe has a contraction section and an expansion section, an inner pipe diameter of the expansion section of the circular pipe is greater than an inner pipe diameter of the contraction section of the circular pipe, the air entrance pipe and the outlet pipe communicate with the contraction section of the circular pipe respectively, the expansion section communicates with the receiving room of the tank, during the inflating, the pair of sealing sections of the middle pipe abut against the contraction section of the circular pipe, and during the glue applying, the contraction section communicates with the expansion section through the neck section.

12. The glue applicator as claimed in claim 10, wherein the inner hollow portion of the middle pipe has a through hole as well as an open end and a closed end opposite to each other, the open end reaches into the receiving room and is immersed in the glue, the through hole is located between the open end and the closed end, the pair of sealing sections and the neck section are located between the through hole and the open end, during the inflating, one of the sealing sections blocks between the through hole and the outlet pipe, and during the glue applying, the inner hollow portion communicates with the outlet pipe through the through hole.

13. The glue applicator as claimed in claim 12, wherein the middle pipe further has another sealing section, the through hole is located between one of the pair of sealing sections and the another sealing section, and the middle pipe forms a necking phenomenon at the through hole.

14. The glue applicator as claimed in claim 12, wherein a back side structure of the closed end is exposed outside the circular pipe, and the middle pipe moves relative to the circular pipe by applying an external force to the back side structure.

15. The glue applicator as claimed in claim 10 further comprises an external pipe sleeved at the circular pipe, communicating with the middle pipe, and located in the tank, wherein an end of the external pipe away from the circular pipe is immersed in the glue, and the tank is translucent for identifying the glue inside.

\* \* \* \* \*